(12) United States Patent
Sugita et al.

(10) Patent No.: US 8,049,942 B2
(45) Date of Patent: Nov. 1, 2011

(54) MULTIPLEXED HOLOGRAPHIC RECORDING APPARATUS AND METHOD AND HOLOGRAPHIC REPRODUCTION APPARATUS AND METHOD

(75) Inventors: Tomoya Sugita, Osaka (JP); Ken'ichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 381 days.

(21) Appl. No.: 12/090,449

(22) PCT Filed: Oct. 17, 2006

(86) PCT No.: PCT/JP2006/320615
§ 371 (c)(1),
(2), (4) Date: Apr. 16, 2008

(87) PCT Pub. No.: WO2007/046354
PCT Pub. Date: Apr. 26, 2007

(65) Prior Publication Data
US 2009/0046336 A1    Feb. 19, 2009

(30) Foreign Application Priority Data
Oct. 17, 2005 (JP) .................................. 2005-301464

(51) Int. Cl.
*G03H 1/28* (2006.01)
(52) U.S. Cl. ............................ 359/24; 359/30
(58) Field of Classification Search ............ 359/3, 10, 359/11, 22, 24
See application file for complete search history.

(56) References Cited

U.S. PATENT DOCUMENTS

| 7,277,208 B2* | 10/2007 | Kihara et al. | 359/3 |
| 7,277,211 B2* | 10/2007 | Baba et al. | 359/24 |
| 7,312,907 B2* | 12/2007 | Kogure et al. | 359/25 |
| 7,532,374 B2* | 5/2009 | Sissom et al. | 359/29 |
| 7,738,152 B2* | 6/2010 | Butler et al. | 359/30 |
| 2004/0179251 A1 | 9/2004 | Anderson et al. | 359/3 |
| 2005/0063028 A1 | 3/2005 | Yasuda et al. | 359/3 |
| 2005/0232125 A1 | 10/2005 | Kuroda et al. | 369/125 |
| 2009/0046337 A1* | 2/2009 | Waldman | 359/24 |

(Continued)

FOREIGN PATENT DOCUMENTS
JP  11-311937  11/1999
(Continued)

OTHER PUBLICATIONS

International Search Report issued Feb. 13, 2007 in International (PCT) Application No. PCT/JP2006/320615.

(Continued)

*Primary Examiner* — Frank Font
(74) *Attorney, Agent, or Firm* — Wenderoth Lind & Ponack, L.L.P.

(57) ABSTRACT

A multiplexed holographic recording apparatus records multiplexed holograms in a plurality of recording regions that are formed on a holographic recording medium. In particular, the apparatus first records a predetermined number of multiplexed holograms in each of the recording regions formed in a predetermined range or an overall range of the holographic recording medium through holographic recording performed N times, and then performs the (N+1)th holographic recording in each recording region formed in the predetermined range or the overall range. When n other recording regions (where n=0, 1, 2, . . . ) are superimposed on each recording region formed on the holographic recording medium, a difference in the degree of multiplexing between the recording regions formed in the predetermined range or the overall range of the holographic recording medium does not exceed a predetermined value of n+1.

29 Claims, 12 Drawing Sheets

U.S. PATENT DOCUMENTS

2009/0080042 A1* 3/2009 Curtis et al. .................. 359/3
2010/0014138 A1* 1/2010 Butler et al. ................. 359/22

FOREIGN PATENT DOCUMENTS

| | | |
|---|---|---|
| JP | 2000-89648 | 3/2000 |
| JP | 2001-147634 | 5/2001 |
| JP | 2003-337525 | 11/2003 |
| JP | 2004-272268 | 9/2004 |
| JP | 2005-32376 | 2/2005 |
| JP | 2005-99176 | 4/2005 |
| JP | 2005-310308 | 11/2005 |

OTHER PUBLICATIONS

Kevin Curtis et al., "Method for holographic storage using peristrophic multiplexing", Jul. 1, 1994, vol. 19, No. 13, Optics Letters, pp. 993-994.

* cited by examiner

| | Number of times of multiplexing | | | |
|---|---|---|---|---|
| | 1 | 2 | ..... | 100 |
| $\theta_1$ | −2.5° | −2.445° | ..... | 2.945° |
| $\theta_2$ | −2.499° | −2.444° | ..... | 2.946° |
| $\theta_3$ | −2.498° | −2.443° | ..... | 2.947° |
| . | . | . | . | . |
| . | . | . | . | . |
| . | . | . | . | . |
| . | . | . | . | . |
| $\theta_{55}$ | −2.446° | −2.391° | ..... | 2.999° |

Fig. 8

MULTIPLEXED HOLOGRAPHIC RECORDING APPARATUS AND METHOD AND HOLOGRAPHIC REPRODUCTION APPARATUS AND METHOD

BACKGROUND OF THE INVENTION

TECHNICAL FIELD

The present invention relates to holographic recording, and more particularly, to a multiplexed holographic recording apparatus that records a plurality of multiplexed holograms in recording regions of a holographic recording medium and to a method for such multiplexed holographic recording.

BACKGROUND ART

The information technology including information digitization has achieved rapid advancement in recent years, and established the trend to distribute various content information, or specifically audio and video data, to users at high speed while maintaining its high information quality. The users typically use such content information by temporarily storing the distributed data in, for example, a hard disk, and selecting information that the users want to hold for a long time from the stored data and editing and storing only the selected information into another recording medium. Systems now in demand are readily applicable to such changes in the ways of distributing data and of using the distributed data. The systems further need to handle explosively larger amounts of information as information with higher quality is distributed. In other words, systems now in demand feature both ultrahigh speed recording and reproduction and ultralarge recording capacity.

One promising technology to satisfy this demand is holographic recording and reproduction. In holographic recording, a signal beam, which is modulated according to data to be recorded, interferes with a reference beam and forms an interference pattern (hologram), which is recorded onto a holographic recording medium. In holographic reproduction, a readout beam illuminates the hologram, which has been recorded on the hologram recording medium, at an angle substantially the same as the angle of the signal beam or the reference beam used when the hologram was recorded. A beam that is diffracted by the hologram is then used to reconstruct the data.

In holographic recording shown in FIG. 1 for example, a two-dimensional modulation pattern (hereafter referred to as "two-dimensional data") 1, which corresponds to data to be recorded, is displayed on a spatial light modulator (e.g. a liquid crystal panel) 2. A signal beam 3 is modulated when passing through the spatial light modulator 2. The modulated signal beam 3 then illuminates a recording region 6 of a holographic recording medium 5 while a reference beam 4 is also illuminating the same recording region 6. The signal beam 3 interferers with the reference beam 4 and forms an interference pattern (hologram), which is recorded in the recording region 6. In this manner, the two-dimensional data 1, which is displayed on the spatial light modulator 2, is recorded all at once, in the form of a hologram, onto the holographic recording medium 5.

In holographic reproduction shown in FIG. 1, each recording region 6 of the holographic recording medium 5 in which a hologram has been recorded is illuminated with a readout beam 7. The angle of the readout beam 7 with respect to each recording region 6 is set substantially the same as the angle of the signal beam 3 or the reference beam 4 used when the hologram was recorded in the recording region 6. When the readout beam 7 illuminates the recording region 6, a beam (reproduction beam) 8 is diffracted by the hologram in the recording region 6. An imaging device 9, which is for example a CCD (charge-coupled device), reconstructs the two-dimensional data 1 using the reproduction beam 8. In this manner, the two-dimensional data 1, which has been recorded on the holographic recording medium 5, is reproduced all at once.

As described above, the holographic recording and reproduction enables the two-dimensional data to be written to or read from the holographic recording medium all at once. Thus, the holographic recording and reproduction features extremely higher data accessing speed than recording and reproduction of conventional optical discs (such as CDs and DVDs).

In the holographic recording and reproduction, a plurality of holograms may be recorded in a single recording region of a holographic recording medium, or a plurality of holograms may be recorded in a plurality of superimposed recording regions (such recording of a plurality of holograms is hereafter referred to as "multiplexed recording"). A plurality of multiplexed holograms may be recorded in a single recording region by, for example, changing the angle of the reference beam with respect to the same recording region for every recording of two-dimensional data in the same recording region. The direction, wavelength, or phase of the reference beam may be changed instead of the angle of the reference beam. In the same manner, a plurality of multiplexed holograms may be recorded in a plurality of superimposed recording regions by, for example, changing the angle or other properties of the reference beam for each recording region. As a result, the holographic recording medium has an extremely higher recording density than conventional other recording media, such as CDs and DVDs, and has a drastically larger recording capacity than the conventional recording media.

Various materials have been proposed for the holographic recording medium (holographic recording materials). Examples of the holographic recording materials include organic materials, such as a photopolymer material, and inorganic materials, such as a material called photorefractive crystal. Research and development is underway to determine which one of these materials is suited for the holographic recording medium based on the basic characteristics of the holographic recording medium including its recording sensitivity, recording capacity, and hologram retaining performance as well as based on other considerations including the manufacturing method and the cost for the holographic recording medium.

Active research and development is also underway on methods for multiplexed holographic recording and reproduction.

Conventional examples of the multiplexed holographic recording and reproduction methods include angle multiplexing (see, for example, Patent Document 1) and peristrophic multiplexing (see, for example, Non-Patent Document 1). Angle multiplexing changes the reference beam and/or the signal beam when illuminating the same recording region. Peristrophic multiplexing rotates the reference beam and the signal beam about the normal to the holographic recording medium when illuminating the same recording region. In angle multiplexing, a mechanical unit, such as a galvanic mirror, or an electric unit, such as a deflector using an acoustooptic device and an electrooptic device, is used to change the angle of the reference beam or the signal beam. In particular, the technique disclosed in Patent Document 1 combines angle multiplexing and peristrophic multiplexing. With this technique, the light flux is deflected using a wedge prism, and the deflection direction of the light flux is controlled by adjusting the rotation angle of the wedge prism.

The examples of the multiplexed recording and reproduction methods further include polytopic multiplexing (see, for example, Patent Document 2). With polytopic multiplexing, a plurality of adjacent recording regions are illuminated simultaneously with a readout beam, and only a reproduction beam coming from a target recording region is extracted through filtering using, for example an aperture, out of reproduction beams that are diffracted from the recording regions.

Patent Document 1: Japanese Unexamined Patent Publication No. 2001-147634

Patent Document 2: Japanese Unexamined Patent Publication No. 2004-272268

Non-Patent Document 1: Kelvin Curitis et al., "Method for holographic storage using peristrophic multiplexing," 19, Opt. Lett. 993 (1994)

Like the methods described above, many conventional methods for multiplexed holographic recording and reproduction mainly aim to increase the recording capacity of holographic recording media further by increasing the degree of multiplexing of holographic recording further, or aim to prevent the diffraction efficiency of multiplexed holograms from decreasing (e.g. to prevent recorded holograms from being erased) as more multiplexed holograms are recorded. Not many conventional methods propose recording sequences in which recording regions are selected when holograms are actually recorded onto holographic recording media. Effective recording and reproduction sequences need to be employed for an efficient seek operation of recording and reproduction heads or the like. Further, the recording and reproduction sequences need to be optimized according to the characteristics of holographic recording media and their light sources. In particular, the recording and reproduction sequences need to be determined in a manner to maintain each one of the advantageous features of holographic recording, namely, the high-speed, high-density, and large-capacity features of holographic recording.

With the conventional methods for multiplexed hologram recording and reproduction, the seek operation of recording and reproduction heads or the seek operation of a holographic recording medium is controlled in a stop-and-go manner as described below. Each head or its internal optical element or the holographic recording medium (hereafter referred to as the "head or the like") moves to a position at which the head or the like can access a target recording region. The head or the like then temporarily stops at the position and performs holographic recording or reproduction in the target recording region. After completing the holographic recording or reproduction, the head or the like again starts moving toward a position at which the head or the like can access a next target recording region. In this manner, the head or the like repeatedly stops and goes every time when holographic recording or reproduction is performed in one recording region. This seek operation requires much longer time than the holographic recording and reproduction process performed in each recording region. To shorten the entire recording and reproduction time further and improve the transfer rate further, the time required for the seek operation described above (seek time) needs to be shortened with respect the entire recording time by employing more effective recording and reproduction sequences.

When an organic material, such as a photopolymer material, is selected from the conventional holographic recording materials, the refractive index of the recording material for example changes as the material polymerizes to change from monomer to polymer (photopolymerizes). Holographic recording is performed using such change of the refractive index occurring as a result of photopolymerization. Here, a photopolymerized portion of the recording material not only will have a different refractive index but also will contract. This means that a recording region in which holographic recording has been performed contracts more as the degree of multiplexing in the recording region is greater. If recording regions formed in a predetermined range or an overall range of the holographic recording medium have degrees of multiplexing that differ significantly from one another, some regions of the holographic recording medium may locally contract excessively. In this case, the regions that have contracted excessively as well as their surrounding regions will have lower diffraction efficiency. As a result, patterns of reproduction beams that are diffracted from these regions may be distorted excessively. To improve the recoding and reproduction quality further, the recording regions formed in the predetermined range or the overall range of the holographic recording medium need to have substantially uniform degrees of multiplexing by employing an efficient recording sequence.

It is an object of the present invention to provide a multiplexed holographic recording and reproduction apparatus that shortens the recording and reproduction time further and improves the recording and reproduction quality further by employing efficient recording and reproduction sequences, and a method for such multiplexed holographic recording and reproduction.

SUMMARY OF THE INVENTION

A multiplexed holographic recording apparatus of the present invention records multiplexed holograms into a plurality of recording regions that are formed on a holographic recording medium. In particular, the apparatus first records a predetermined number of multiplexed holograms in each of the recording regions formed in a predetermined range or an overall range of the holographic recording medium through holographic recording performed N times, and then performs an (N+1)th holographic recording in each recording region in the predetermined range or the overall range. It is preferable that the recording regions are arranged in a manner that different recording regions are not superimposed on one another on the holographic recording medium. Alternatively, the recording regions may be arranged in a manner that a plurality of other recording regions are superimposed on each recording region. When n other recording regions (where n=0, 1, 2, . . . ) are superimposed on each recording region, a difference in the degree of multiplexing between the recording regions formed in the predetermined range or the overall range of the holographic recording medium does not exceed a predetermined value of n+1. In this case, the recording regions formed in the predetermined range or the overall range contract by substantially uniform degrees. This prevents the diffraction efficiency of multiplexed holograms from decreasing and reproduction beam patterns from being distorted. As a result, the multiplexed holographic recording apparatus of the present invention achieves a high reproduction quality.

The multiplexed holographic recording apparatus of the present invention preferably employs angle multiplexing. More specifically, the apparatus changes an angle of at least one of a reference beam and a signal beam with respect to the holographic recording medium by changing a path of the reference beam and/or the signal beam. In particular, the angles of the reference beams or the like used to record a plurality of holograms in the same recording region need to differ from each other by at least a predetermined minimum value. Here, this minimum value is determined by the upper limit of the degree of multiplexing of holographic recording (hereafter referred to as the "maximum degree of multiplexing) that depends on the angular selectivity of the holographic recording medium and by the maximum degree of multiplexing that depends on the angular resolution of the holographic recording and reproduction apparatus. The above apparatus of the present invention that employs angle multiplexing preferably also changes the beam angle to differ between adjacent recording regions. Further, when a plurality of other recording regions are superimposed on each recording region, the apparatus also changes the beam angle to differ between recording regions that are superimposed on one another. This enables a reproduction beam to be generated only from a target recording region even when a plurality of recording regions that are adjacent to one another or superimposed on one another are illuminated simultaneously with a readout beam. In other words, the apparatus eliminates crosstalk between the recording regions, and achieves a high reproduction quality.

When the apparatus employs angle multiplexing, the apparatus requires a long time to change the angle of the reference beam or the like. When the above apparatus of the present invention first performs an m-th holographic recording in one recording region, next performs holographic recording in one or more other recording regions, and then performs an (m+1) th holographic recording in the recording region in which the m-th holographic recording has been performed, the apparatus may preferably set the beam angle to increase monotonically or decrease monotonically in a sequence in which the holographic recordings are performed. Here, setting the beam angle to increase monotonically or decrease monotonically includes maintaining the beam angle to be unchanged from the beam angle used in the immediately preceding holographic recording. In this case, the beam angle differs only slightly between at least two holographic recordings that are performed sequentially. This shortens the time required to change the beam angle, and consequently shortens the entire recording and reproduction time and improves the transfer rate.

The multiplexed holographic recording apparatus of the present invention preferably first records the predetermined number of multiplexed holograms in one recording region and then selects, as a target for a next holographic recording, another recording region that is different from any recording region adjacent to the recording region in which the predetermined number of multiplexed holograms have been recorded, or another recording region that is different from any recording region superimposed on the recording region in which the predetermined number of multiplexed holograms have been recorded. This increases the degree of multiplexing of each recording region uniformly throughout the predetermined range or the overall range of the holographic recording medium. Thus, the recording regions formed in the predetermined range or the overall range contract by substantially uniform degrees. This prevents the diffraction efficiency of multiplexed holograms from decreasing. As a result, the multiplexed holographic recording apparatus achieves a high recording and reproduction quality. Further, when the apparatus employs angle multiplexing, the recording region that is selected as the next holographic recording target is sufficiently away from the recording region selected in the immediately preceding holographic recording. In this case, the value by which the angle of the reference beam or the like differs between the two sequential holographic recordings may be smaller than the above predetermined minimum value, which is determined by the maximum degrees of multiplexing. This shortens the time required to change the beam angle to differ between the holographic recordings, and consequently shortens the entire recording and reproduction time and improves the transfer rate.

The holographic recording medium may be a disc medium. In this case, the multiplexed holographic recording apparatus of the present invention preferably selects a target recording region from a first group of recording regions when repeating holographic recording while moving spots of a signal beam and a reference beam that are focused on the holographic recording medium in a direction from an outer circumference to an inner circumference of the holographic recording medium, and selects the target recording region from a second group of recording regions when repeating holographic recording while moving the spots in a direction from the inner circumference to the outer circumference. Here, the recording regions in the second group are not superimposed on the recording regions in the first group. The apparatus of the present invention shortens the seek time required in the radial direction of the holographic recording medium while increasing the degree of multiplexing uniformly throughout the predetermined range or the overall range of the holographic recording medium.

The holographic recording medium may be a disc medium. In this case, the multiplexed holographic recording apparatus of the present invention preferably first performs holographic recording the predetermined number of times or less in recording regions that are at the same distance from a center of the holographic recording medium among the recording regions formed in the predetermined range or the overall range, and then moves spots of a signal beam and a reference beam that are focused on the holographic recording medium in a radial direction of the holographic recording medium. In this case, a difference in the degree of multiplexing between the recording regions that are at the same distance from the center of the holographic recording medium does not exceed a predetermined value. Thus, the recording regions contract by substantially uniform degrees. This prevents the diffraction efficiency of multiplexed holograms from decreasing and reproduction beam patterns from being distorted. As a result, the multiplexed holographic recording apparatus achieves a high reproduction quality. The apparatus of the present invention further shortens the seek time required in the radial direction of the holographic recording medium while increasing the degree of multiplexing uniformly throughout the predetermined range or the overall range of the holographic recording medium.

The multiplexed holographic recording apparatus of the present invention preferably illuminates a region on the holographic recording medium that does not overlap any recording region or a boundary on the holographic recording medium that is defined by the predetermined range (hereafter referred to as a "non-recording region") with a predetermined signal beam and/or a reference beam. Here, the predetermined signal beam is preferably a beam that does not contain two-dimensional data. More specifically, the predetermined beam is preferably a beam that has been modulated uniformly by a spatial light modulator or a beam that has not been modulated at all. Illuminating the non-recording region with the signal beam or the reference beam reduces a difference in the degree of contraction between the non-recording region and the recording regions, which occurs as a result of photopolymerization. This prevents the recording regions from being distorted by such a difference in the degree of contraction between the non-recording region and the recording regions, and prevents the diffraction efficiency of multiplexed holograms from decreasing and reproduction beam patterns from being distorted. As a result, the multiplexed holographic recording apparatus achieves a high reproduction quality.

A holographic reproduction apparatus of the present invention reads two-dimensional data that has been recorded on a holographic recording medium by the multiplexed holographic recording apparatus of the present invention described above. The reproduction apparatus particularly reproduces holograms in a sequence of recording regions in which the above recording apparatus of the present invention has performed holographic recording in the recording regions. More specifically, the reproduction sequence is set identical to the recording sequence employed by the above recording apparatus of the present invention. In same manner as the above recording apparatus of the present invention, the reproduction apparatus shortens the entire reproduction time and improves the transfer rate.

A holographic recording medium of the present invention includes a plurality of recording regions in which multiplexed holograms are recordable. In particular, a difference between a highest value and a lowest value of degrees of multiplexing of holographic recording performed in the recording regions formed in a predetermined range or an overall range of the holographic recording medium is maintained not to exceed a predetermined value. In this case, the recording regions formed in the predetermined range or the overall range contract by substantially uniform degrees. This prevents the diffraction efficiency of multiplexed holograms from decreasing and reproduction beam patterns from being distorted. As a result, the holographic recording medium of the present invention achieves a high recording quality.

The multiplexed holographic recording apparatus of the present invention maintains a difference in the degree of multiplexing between recording regions formed in a predetermined range or an overall range of the holographic recording medium not to exceed a predetermined value by controlling the recording sequence in the manner described above. Thus, the recording regions formed in the predetermined range or the overall range contract by substantially uniform degrees. This prevents the diffraction efficiency of multiplexed holograms from decreasing and reproduction beam patterns from being distorted. As a result, the multiplexed holographic recording apparatus of the present invention achieves a high reproduction quality. When the present invention is applied to angle multiplexing, the recording region that is selected as a next holographic recording target is sufficiently away from the recording region selected in the immediately preceding holographic recording. Thus, the value by which the angle of the reference beam or the like differs between these holographic recordings may be smaller than the predetermined minimum value that is determined by the maximum degrees of multiplexing. This shortens the time required to change the beam angle to differ between the holographic recordings, and consequently shortens the entire recording and reproduction time and improves the transfer rate. Further, when the present invention is applied to angle multiplexing and the angle of the reference beam or the like with respect to the holographic recording medium is changed using a mechanical unit, the mechanical unit operates smoothly. In this case, the beam angle is changed in a highly reliable manner.

BRIEF DESCRIPTION OF DRAWINGS

FIG. 8 is a table showing the angle of a reference beam used for every multiplexed holographic recording performed in each recording region of a holographic recording medium with a multiplexed holographic recording method according to a second embodiment of the present invention;

DETAILED DESCRIPTION OF THE INVENTION

Embodiments of the present invention will now be described with reference to the drawings.

First Embodiment

Figure 1:
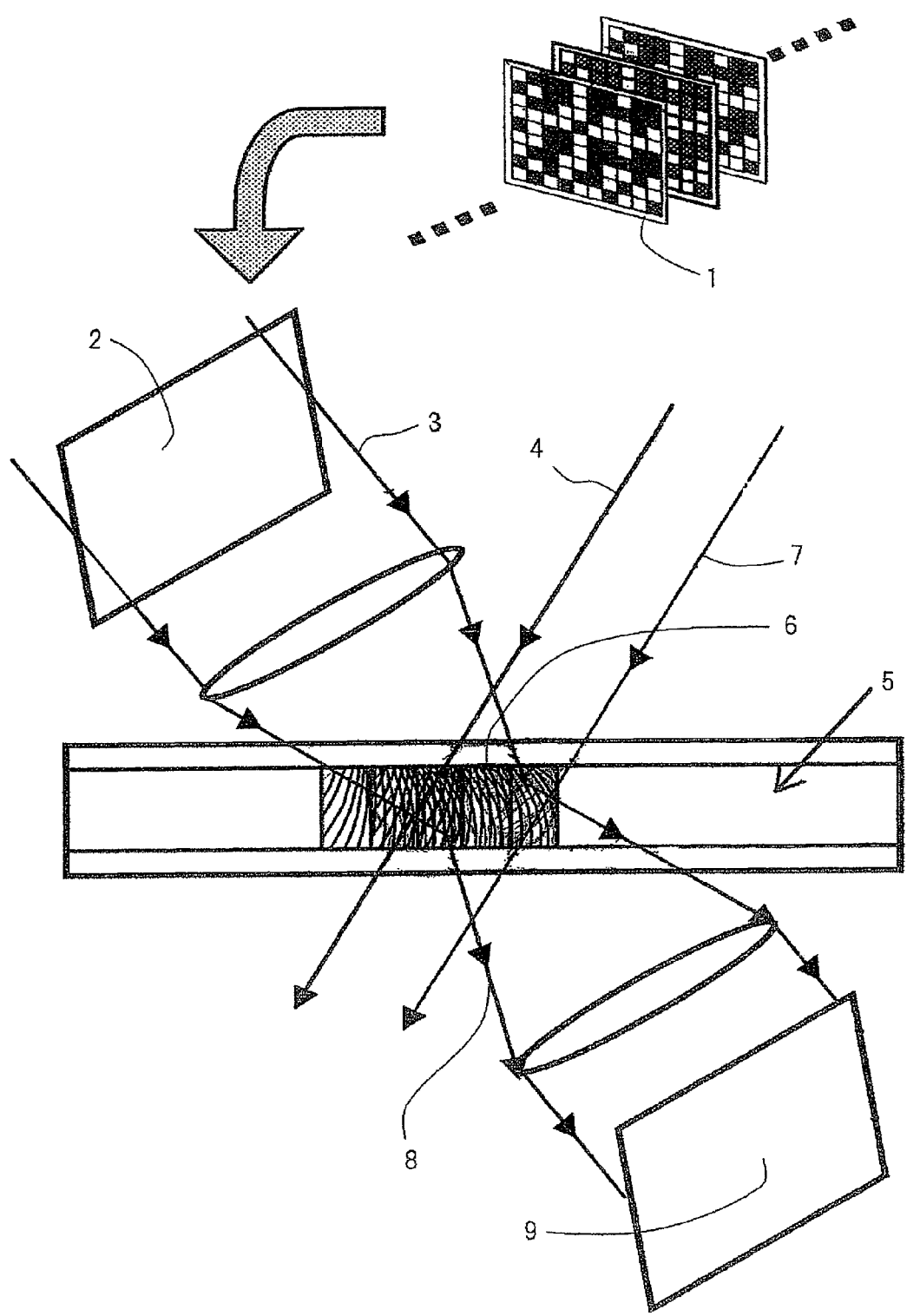
FIG. 1 is a schematic view showing the principle of holographic recording and reproduction.
Figure 2:
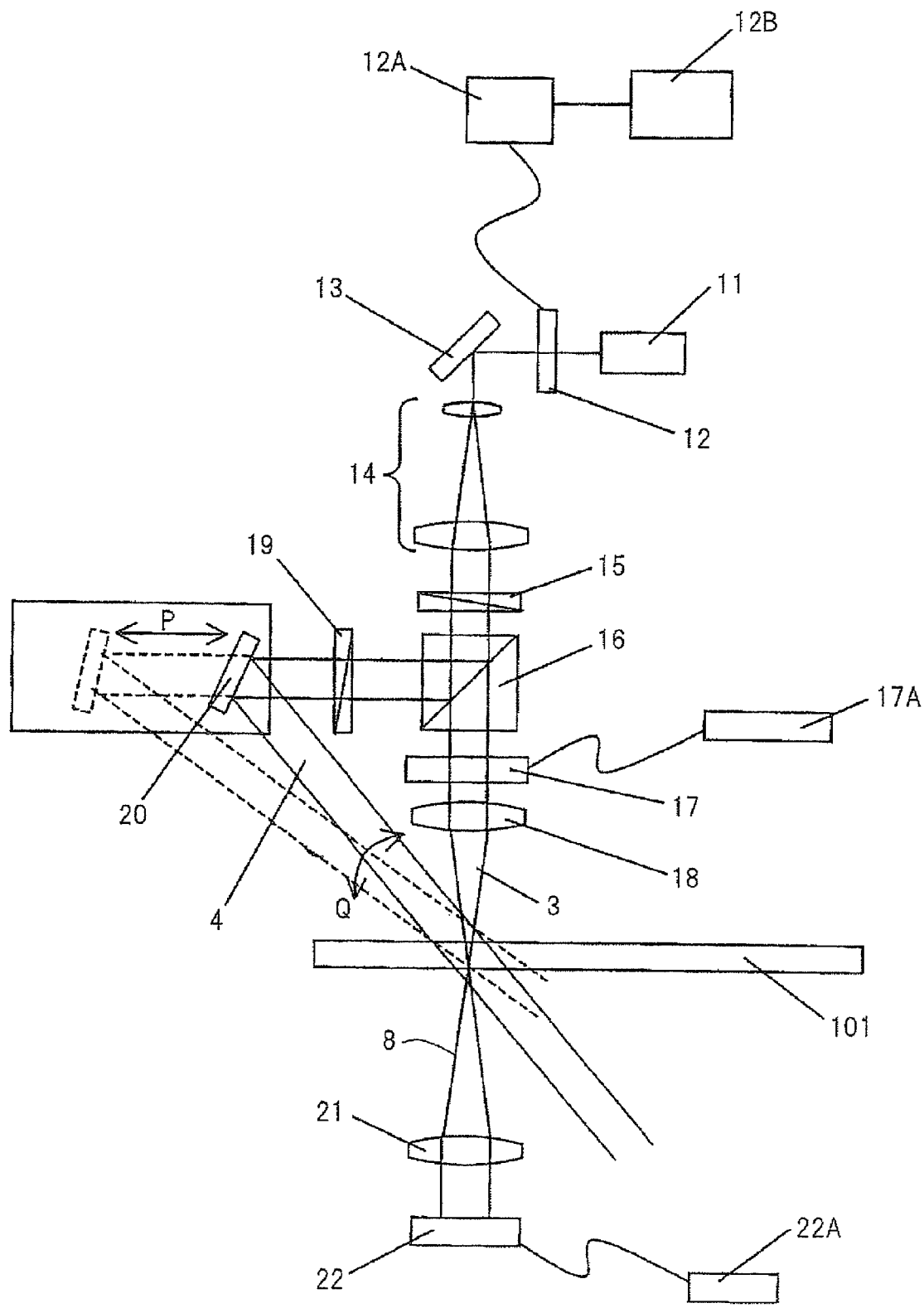
FIG. 2 is a block diagram showing the structure of a multiplexed holographic recording and reproduction apparatus according to an embodiment of the present invention.

FIG. 2 shows the structure of a multiplexed holographic recording and reproduction apparatus according to an embodiment of the present invention. The structure of the recording and reproduction apparatus is made of a recording medium supporting system, a recording system, and a reproduction system. The recording medium supporting system (not shown in FIG. 2) rotatably supports a holographic recording medium 101, on which recording and reproduction is performed. The recording medium supporting system preferably rotates the holographic recording medium 101 about its central axis at a predetermined speed. The recording system preferably includes a light source 11, a shutter 12, a stationary mirror 13, a magnification optical system 14, a first half-wavelength plate 15, a beam splitter 16, a spatial light modulator 17, a lens 18, a second half-wavelength plate 19, and a movable mirror 20. These elements of the recording system are preferably integrated to function as a recording head. The recording head is movably arranged at a predetermined distance from one side of the holographic recording medium 101, on which recording is performed. The recording system further includes a shutter control unit 12A, a recording scheduling unit 12B, and a two-dimensional data input unit 17A. The reproduction system preferably shares the optical elements excluding the spatial light modulator 17 and the lens 18 with the recording system. In addition to the elements shared with the recording system, the reproduction system further includes a reproduction optical system 21 and an imaging device 22. The reproduction optical system 21 and the imaging device 22 are preferably integrated to function as a reproduction head. The reproduction head is movably arranged at a predetermined distance from one side of the holographic recording medium 101, from which reproduction is performed. The reproduction head faces the recording head with the holographic recording medium 101 being between the recording head and the reproduction head. The reproduction system further includes a reproduction signal fetch unit 22A.

The light source 11 is a pulse laser having a high output. The pulse width of the light source 11 is preferably 10 nanoseconds or less. The shutter 12 is controlled by the shutter control unit 12A to shut a laser beam emitted from the light source 11 at a predetermined timing. The timing at which the shutter 12 shuts the laser beam is set by the recording scheduling unit 12B. The stationary mirror 13 reflects a laser beam that has been emitted from the light source 11 and passed through the shutter 12, and directs the laser beam to the magnification optical system 14. The magnification optical system 14 is made of a plurality of lenses, and magnifies the laser beam to be greater than two-dimensional data that is displayed on the spatial light modulator 17. The first half-wavelength plate 15 changes the polarization ratio of the laser beam before the laser beam enters the beam splitter 16. This adjusts the powers of two laser beams 3 and 4, into which the laser beam is split by the beam splitter 16. The beam splitter 16 splits the incoming laser beam into two different polarized beams, and emits one beam (signal beam) 3 to the spatial light modulator 17 and the other beam (reference beam) 4 to the second half-wavelength plate 19.

The spatial light modulator 17 is preferably a liquid crystal panel. In holographic recording, the spatial light modulator 17 displays a two-dimensional modulation pattern (two-dimensional data). The signal beam 3 passes through the spatial light modulator 17 and is modulated according to the two-dimensional data. The two-dimensional data input unit 17A sets the two-dimensional data based on data to be recorded. The lens 18 focuses the spot of the modulated signal beam 3 onto a target region formed on the holographic recording medium 101. The second half-wavelength plate 19 rotates the reference beam 4 in a manner that the polarization direction of the reference beam 4 coincides with the polarization direction of the signal beam 3. The movable mirror 20 reflects the reference beam 4 to shine on the spot of the signal beam 3, which has been focused onto the holographic recording medium 101. Here, the movable mirror 20 is movable in the direction in which the reference beam 4 that is yet to be reflected travels (see arrow P in FIG. 2). Further, the reflecting surface of the movable mirror 20 is rotatable about a predetermined axis. The movable mirror 20 moves and rotates to change the angle of the reference beam 4 with respect to the holographic recoding medium 101 (see arrow Q in FIG. 2). The signal beam 3 and the reference beam 4 interfere with each other at the spot of the signal beam 3 that is focused on the holographic recording medium 101. As a result, the signal beam 3 and the reference beam 4 form an interference pattern (hologram), which is recorded in the corresponding region on the holographic recording medium 101.

In holographic reproduction, the spatial light modulator 17 shuts the signal beam 3. As a result, the holographic recording medium 101 is illuminated only with the laser beam 4 (readout beam) reflected by the movable mirror 20. Here, the movable mirror 20 moves and rotates (see arrow P in FIG. 2) to change the angle of the readout beam 4 with respect to the holographic recording medium 101 (see arrow Q in FIG. 2). According to the angle of the readout beam 4, a laser beam (reproduction beam) 8 is diffracted by the hologram, which has been recorded on the holographic recording medium 101. The reproduction beam 8 enters the reproduction optical system 21. The reproduction optical system 21 collimates the reproduction beam 8, and directs the collimated beam to enter the imaging device 22. The imaging device 22 is preferably a CCD (charge-coupled device) or a CMOS (complementary metal oxide semiconductor) sensor. The imaging device 22 converts a pattern represented by the reproduction beam 8 to an electric signal. Based on the electric signal resulting from the conversion performed by the imaging device 22, the reproduction signal fetch unit 22A reconstructs the data that has been recorded on the holographic recording medium 101.

Figure 3A:
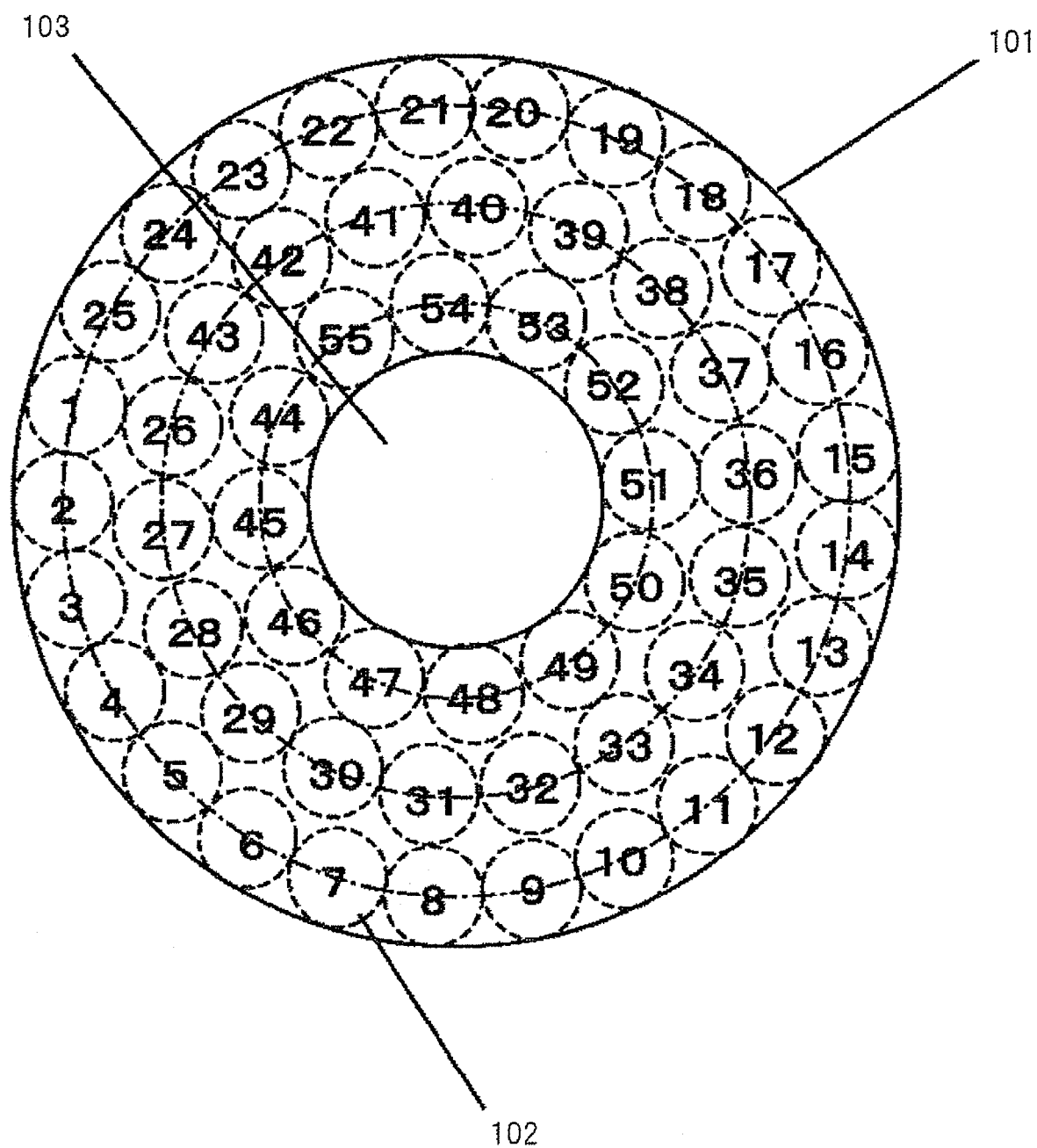
FIG. 3A is a plan view schematically showing recording regions formed on a holographic recording medium and one example of their recording sequence to which a multiplexed holographic recording method according to a first embodiment of the present invention is applied.
Figure 6A:
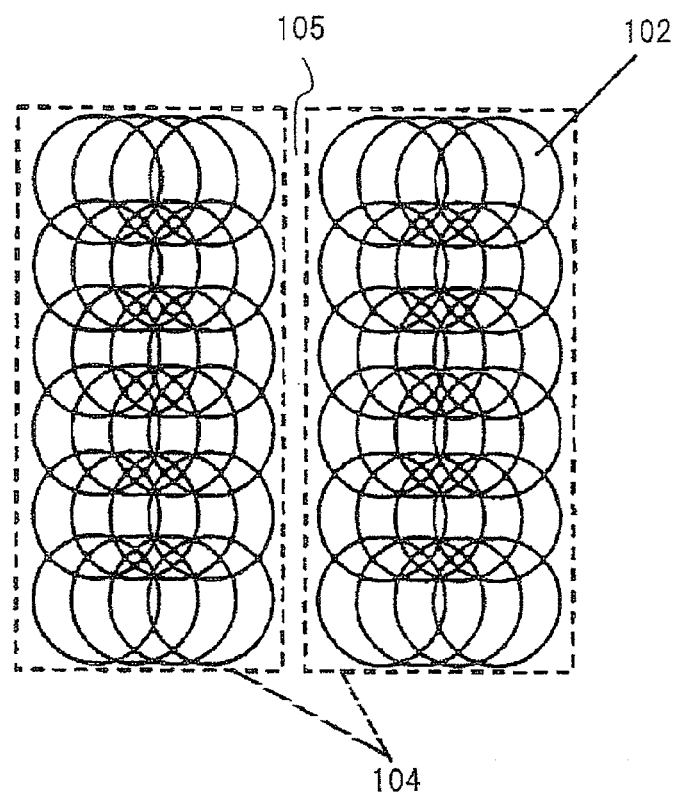
FIG. 6A is an enlarged plan view schematically showing recording regions formed on a holographic recording medium to which a multiplexed holographic recording method according to a modification of the first embodiment is applied.

FIG. 3A is a plan view of a holographic recording medium to which a multiplexed holographic recording method according to a first embodiment of the present invention is applied. The holographic recording medium (hereafter simply referred to as "recording medium") 101 is preferably a disc medium. The recording medium 101 is made of a central non-recording unit 103 and an annular effective recording unit that is formed around the non-recording unit 103. Like in an optical disc such as a CD and a DVD, the non-recording unit 103 functions as a chuck unit, through which the recording medium 101 is rotatably supported by the multiplexed holographic recording apparatus. The effective recording unit includes a plurality of recording regions 102. The recording regions 102 are preferably arranged on concentric circles and are not superimposed on one another. Alternatively, the recording regions may be superimposed on one another as shown in FIG. 6A for example. Each recording region 102 is preferably circular when viewed from above. A plurality of multiplexed holograms are recordable in each recording region 102.

For ease of explanation with reference to FIG. 3A, 55 recording regions 102 are assumed to be formed on the recording medium 101, and 100 multiplexed holograms are assumed to be recorded in each of the recording regions 102. Numerals 1 to 55 shown within the recording regions 102 in FIG. 3A are serial numbers of the recording regions 102, and indicate the recording sequence in which each of the recording regions is selected as a target for holographic recording. In FIG. 3A, the recording regions 102 are arranged in three rows in the radial direction of the recording medium 101. Recording regions to which the method of the first embodiment of the present invention is applicable should not be limited to the recording regions with the shape, dimensions, and arrangement shown specifically in FIG. 3A, but may be modified variously. As one example, when the recording medium 101 has an outer diameter of 12 cm, its effective recording unit occupies about 3 to 4 cm in diameter from the peripheral edge of the recording medium 101, and each recording region 102 is a circular region with a diameter of 2 mm, 20 to 30 rows of recording regions 102 can be arranged in the radial direction of the recording medium 101. In this case as well, the method of the first embodiment also has the same advantages.

Multiplexed holographic recording typically refers to forming a plurality of holograms in the same volume of the recording medium. Here, planar regions in each of which a hologram has been formed may completely coincide with one another or may slightly differ from one another. Multiplexed holographic recording is achieved by changing the angle, wavelength, phase code, or other properties of a beam that is used to record or reproduce each hologram. Many methods for such multiplexed holographic recording use the angular selectivity of Bragg diffraction to separate a plurality of holograms from one another. With angle multiplexing for example, the angle of the signal beam or the reference beam used for recording with respect to the recording medium differs depending on every one of the multiplexed holograms recorded in the same volume (see FIG. 4). To reproduce a hologram with angle multiplexing, a reproduction beam from the target hologram is extracted only when the angle of the readout beam substantially coincides with the angle of the signal beam or the reference beam used when the hologram was recorded. In this manner, adjusting the angle of the readout beam enables a desired hologram to be separated from the multiplexed holograms that have been recorded in the same volume and enables the desired hologram to be reproduced. Here, to separate two multiplexed holograms recorded in the same volume, the beam angle for one hologram and the beam angle for the other hologram need to be set different from each other by at least a minimum value (hereafter referred to as an "angular selectivity value"). The total number of holograms that can be multiplexed in the same volume (the maximum degree of multiplexing) is theoretically $\theta/\Delta\theta$, where $\theta$ is the angle range of the signal beam and the reference beam and $\Delta\theta$ is the angular selectivity value. However, the actual maximum degree of multiplexing has limitations due to the angular resolution of the recording and reproduction apparatus and limitations due to the properties of the holographic recording material described below. Performance of the holographic recording material, such as a photopolymer material, is evaluated using the M number (M/#). The M/# is proportional to the square root of the diffraction efficiency of the recording material, and is proportional to the ratio at which the refractive index of the recording material changes as the recording material photopolymerizes. The diffraction efficiency is higher as the M/# is greater. Dividing the M/# by the minimum diffraction efficiency required in reproduction will yield the maximum number of holograms that can be multiplexed based on the properties of the recording material. In this manner, the above maximum number of holograms unique to the recording material, together with the angular resolution, wavelength resolution, or phase code number unique to the recording and reproduction apparatus, determines the actual maximum degree of multiplexing. The actual maximum degree of multiplexing determined in this manner then determines the recording capacity of the entire recording medium.

Figure 4:
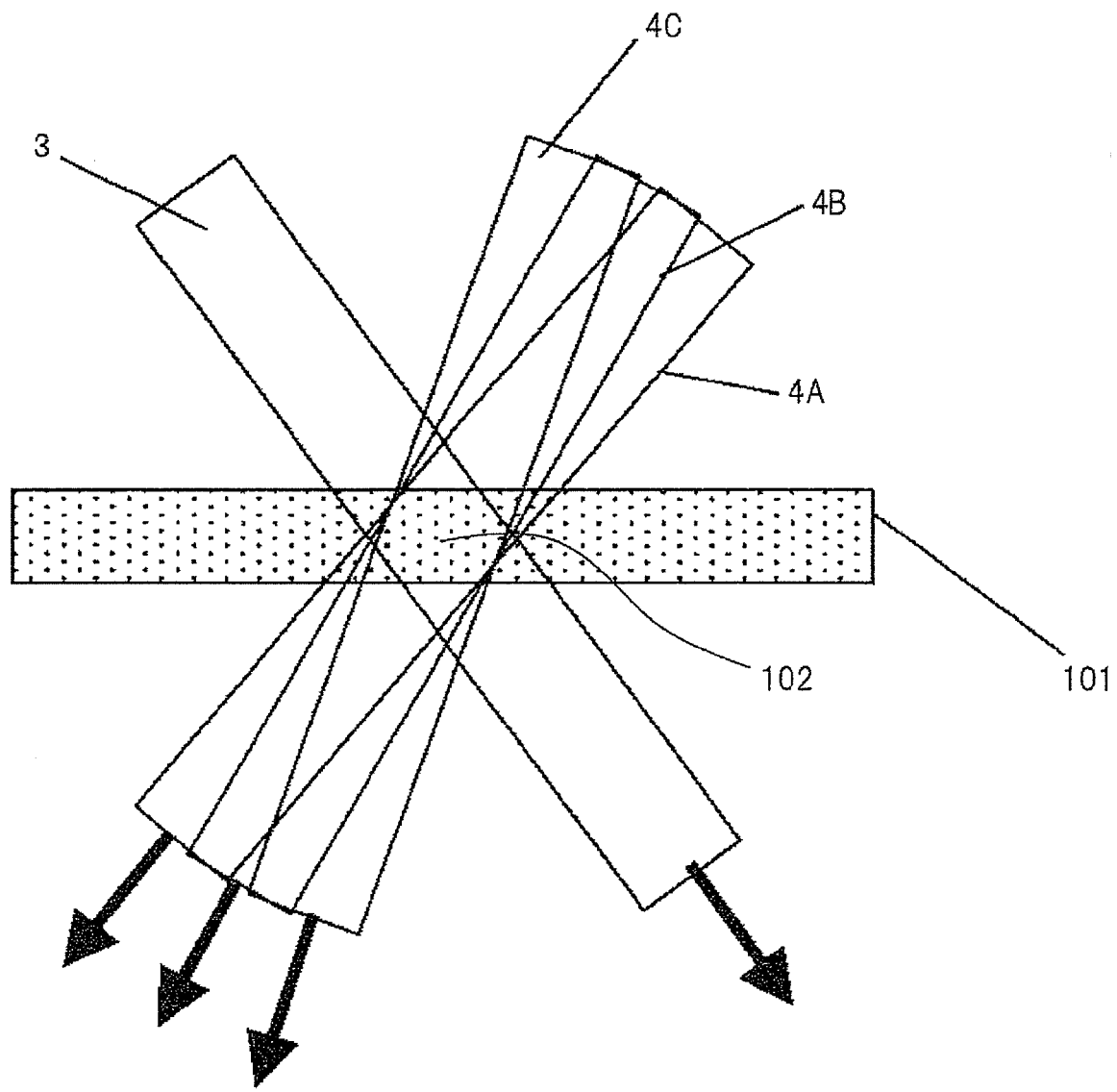
FIG. 4 is a cross-sectional view schematically showing the directions of a signal beam and a reference beam with respect to a holographic recording medium to which a multiplexed holographic recording method using angle multiplexing is applied.

The principle of multiplexed recording using angle multiplexing will now be described in more detail with reference to FIG. 4. Like the multiplexed recording performed by the recording apparatus shown in FIG. 2, a plurality of multiplexed holograms are recorded into the single recording region 102 of the recording medium 101 while the angle of the signal beam 3 with respect to the recording region 102 is being unchanged but the angle of the reference beam with respect to the recording region 102 is being changed for every holographic recording, or specifically reference beams 4A, 4B, and 4C are used for different holographic recordings as shown in FIG. 4. To reproduce a hologram that has been recorded using the signal beam 3 and the reference beam 4A for example, the recording region 102 is illuminated with the readout beam at the angle substantially the same as the angle of the reference beam 4A. Here, the angle of the readout beam is set "substantially" the same as the angle of the reference beam 4A. This is because the optimum angle of the readout beam may slightly deviate from the angle of the reference beam 4A when the recording region 102 contracts as a result of photopolymerization during recording or due to thermal factors during recording and reproduction. This deviation needs to be considered when the minimum value (angular selectivity value), by which the angle of the reference beam differs between multiplexed holograms recorded in the same recording region 102, is adjusted. As a result, a plurality of multiplexed holograms recorded in the recording region 102 are reliably separable from one another when the holograms are reproduced. As one example, when the angular selectivity value is 0.01° and the largest possible reference beam angle due to mechanical limitations is 60° (with respect to the normal to the recording medium 101), 3000 multiplexed holograms are recordable in the same recording region 102.

The conventional multiplexed recording method using angle multiplexing will now be described. While the recording medium 101 is stationary, holograms are first recorded with a degree of multiplexing close to the maximum degree of multiplexing (e.g. 100 holograms) in a first recording region 102 (e.g. indicated by numeral 1 in FIG. 3A). Then, the recording medium 101 is for example rotated to move the spots of the signal beam and the reference beam to a second recording region 102 (indicated by numeral 2 in FIG. 3A) that is adjacent to the first recording region 102. The recording medium 101 is set again stationary. In this state, holograms are recorded with the degree of multiplexing close to the maximum degree of multiplexing (100 holograms) in the second recording region 102. After that, the same operation is repeated until holograms are recorded with the degree of multiplexing close to the maximum degree of multiplexing (100 holograms) in each recording region 102 on the recording medium 101 according to the recording sequence shown in FIG. 3A. In this manner, the conventional multiplexed recording method using angle multiplexing repeatedly stops and rotates the recording medium 101 for holographic recording performed in each recording region 102. In other words, the conventional multiplexed recording is performed in the stop-and-go manner. In particular, multiplexed recording is first repeated the number of times close to the maximum degree of multiplexing in one recording region 102 and then multiplexed recording is performed in the next recording region 102. This operation requires the angle of the reference beam or the like to be changed significantly when moving from one recording region 102 to another. Changing the angle of the reference beam or the like requires long time. When the time required to change the angle of the reference beam or the like is added to the time required to move the spot of the reference beam or the like from one recording region to another, the seek time increases with respect to the entire recording time. As a result, this method fails to improve the amount of information transferred per unit time (transfer rate). In particular, the angle of the reference beam or the like may be changed using, for example, a mirror device, like in the recording apparatus shown in FIG. 2. To improve the transfer rate in this case, the angle of the mirror needs to be changed at a higher speed, and further holographic recording needs to be started promptly after the angle of the mirror is changed to a target value. However, because of the turning moment of the mirror, the mirror requires longer time to brake as the angular speed of the mirror is higher. The time required to brake the mirror constitutes the loss time in holographic recording, and limits the transfer rate.

The recording time required with the conventional multiplexed recording method using angle multiplexing will now be described in detail based on numerical values. When, for example, a pulse laser having a high output is used, the time for which each recording region 102 is illuminated with the reference beam or the like is about 10 microseconds per hologram. In FIG. 3A for example, the total illumination time of the laser required to record 100 multiplexed holograms in each of all the 55 recording regions 102 will be 55 milliseconds. When, for example, the diameter of each recording region 102 is 2 mm and the beam spot moves from one recording region to another at a speed of 1 m/sec, the spot of the reference beam or the like requires 2 milliseconds to move between adjacent recording regions. In FIG. 3A for example, the spot of the reference beam or the like requires at least 108 milliseconds to move to each of all the 55 recording regions 102. Further, when the angular selectivity value of the recording region 102 is 0.05° and 100 multiplexed holograms are to be recorded in each recording region 102, the maximum amount by which the reference beam is changed is 4.95°. In that case, when the angular speed of the mirror is 0.1° per millisecond, the total time required by the mirror to rotate for each recording region is 49.5 milliseconds. Further, when the relaxation oscillation time of the mirror is assumed to be 100 microseconds, the time required to brake the mirror, which is 9.9 milliseconds per recording region 102, is added to the seek time. As a result, the recording time required to record 100 multiplexed holograms in each of all the 55 recording regions 102 of the recording medium 101 includes the total laser illumination time of 55 milliseconds and the total seek time requiring as long as 3 seconds or more. As described above, with the conventional multiplexed recording method, the seek time is extremely long with respect to the entire recording time. The seek time with respect to the entire recording time significantly increases as the degree of multiplexing is higher or as the number of recording regions 102 is greater.

Unlike the conventional method described above, the multiplexed holographic recording method according to the first embodiment of the present invention increases the degree of multiplexing substantially uniformly throughout the entire recording medium 101. This is achieved by employing the recording sequence described below. In FIG. 3A for example, one hologram is first recorded in each of all the 55 recording regions 102 using the reference beam at the same angle according to the recording sequence indicated by numerals 1 to 55 shown in FIG. 3A. In particular, the beam angle is the same in these recordings. With this method, the operation of rotating the recording medium 101 requires less time and the operation of moving the recording head in the radial direction of the recoding medium 101 requires less time. When the recording apparatus shown in FIG. 2 uses a pulse laser with a pulse width of 10 nanoseconds or less as its light source, the recording medium 101 may rotate continuously and the recording head may move continuously between these recordings. After one hologram is recorded in each of all the 55 recording regions 102, the angle of the reference beam is changed by at least the angular selectivity value. Following this, one hologram is recorded again in each of all the 55 recording regions 102 using the reference beam with the set angle according to the sequence indicted by numerals 1 to 55 shown in FIG. 3A. This operation is repeated the number of times close to the maximum degree of multiplexing (100 times). In particular, after N holograms (where N≧1) are recorded in each recording region 102 of the recording medium 101, the (N+1)th multiplexed holographic recording is performed in each recording region 102. As compared with the conventional recording method, this method significantly reduces the time required to move the spot of the reference beam or the like between the recording regions, the time required to rotate the mirror, and the time required to brake the mirror against relaxation oscillation of the mirror with respect to the entire recording time. As a result, this method significantly improves the transfer rate as compared with the conventional recording method. The recording medium 101 may be rotated, for example, at 4000 to 8000 rpm. In this case, the time required to move the spot of the reference beam or the like between the recording regions 102 that are on any adjacent two of all the circumferences from the outermost circumference to the innermost circumference of the recording medium 101 is as short as about 10 microseconds. Further, the total rotation time of the mirror required in all the holographic recordings is as short as 49.5 milliseconds. As a result, the entire seek time is as short as about 60 milliseconds, which even includes the mirror braking time of 9.9 milliseconds. Further, with the method according to the first embodiment of the present invention, the seek time increases much less even when the degree of multiplexing increases or the number of the recording regions 102 increases as compared with when the conventional method is used. Thus, the method according to the first embodiment of the present invention enables the multiplexed holographic recording to achieve a higher transfer rate.

A photopolymer material is preferably used as the recording material for the recording medium 101. In this case, a portion of the recording medium 101 that is illuminated with the laser beam photopolymerizes to change from monomer to polymer. The photopolymerized portion and a matrix material or a binder will have different refractive indexes. Using the difference in the refractive index between the photopolymerized portion and the matrix material portion or binder portion, a hologram is recorded in the photopolymerized portion. Here, when the recording medium 101 is chemically or structurally changed by photopolymerization, the changed portion of the recording medium 101 not only will have a different refractive index but also will contract in volume. The degree of contraction is proportional to the amount of polymer formation. When a specific recording region 102 is repeatedly illuminated with a laser beam excessively with the conventional method, the recording region will contract significantly. In this case, the recording region and the surrounding regions will have distorted reproduction beam patterns, or will have lower diffraction efficiency. Moreover, monomer that is yet to change to polymer easily disperses according to its concentration gradient and moves to the recording region from adjacent unrecorded regions. In this case, the recording characteristics (such as the M/# and sensitivity) of the unrecorded regions will deteriorate. As a result, the characteristics of the entire recording medium 101 may deteriorate easily. For example, the recording capacity of the recording medium 101 may decrease. In contrast, the method according to the first embodiment of the present invention increases the degree of multiplexing substantially uniformly throughout the entire recording medium 101 by employing the recording sequence described above. Thus, even when a photopolymer material is used as the recording material for the recording medium 101, the method reduces local contraction of the recording material that may occur as a result of photopolymerization. The method consequently reduces deterioration of the recording medium 101 caused by such uneven local contraction of the recording material. In particular, a difference in the number of multiplexed holograms between the recording region 102 of the recording medium 101 is always maintained not to exceed 1. Thus, the recording regions 102 contract by substantially uniform degrees. As a result, the angle of the readout beam necessary for reproduction is maintained substantially the same as the angle of the reference beam used in recording. Further, the diffraction efficiency of each of all the holograms recorded will be substantially uniform.

Figure 3B:
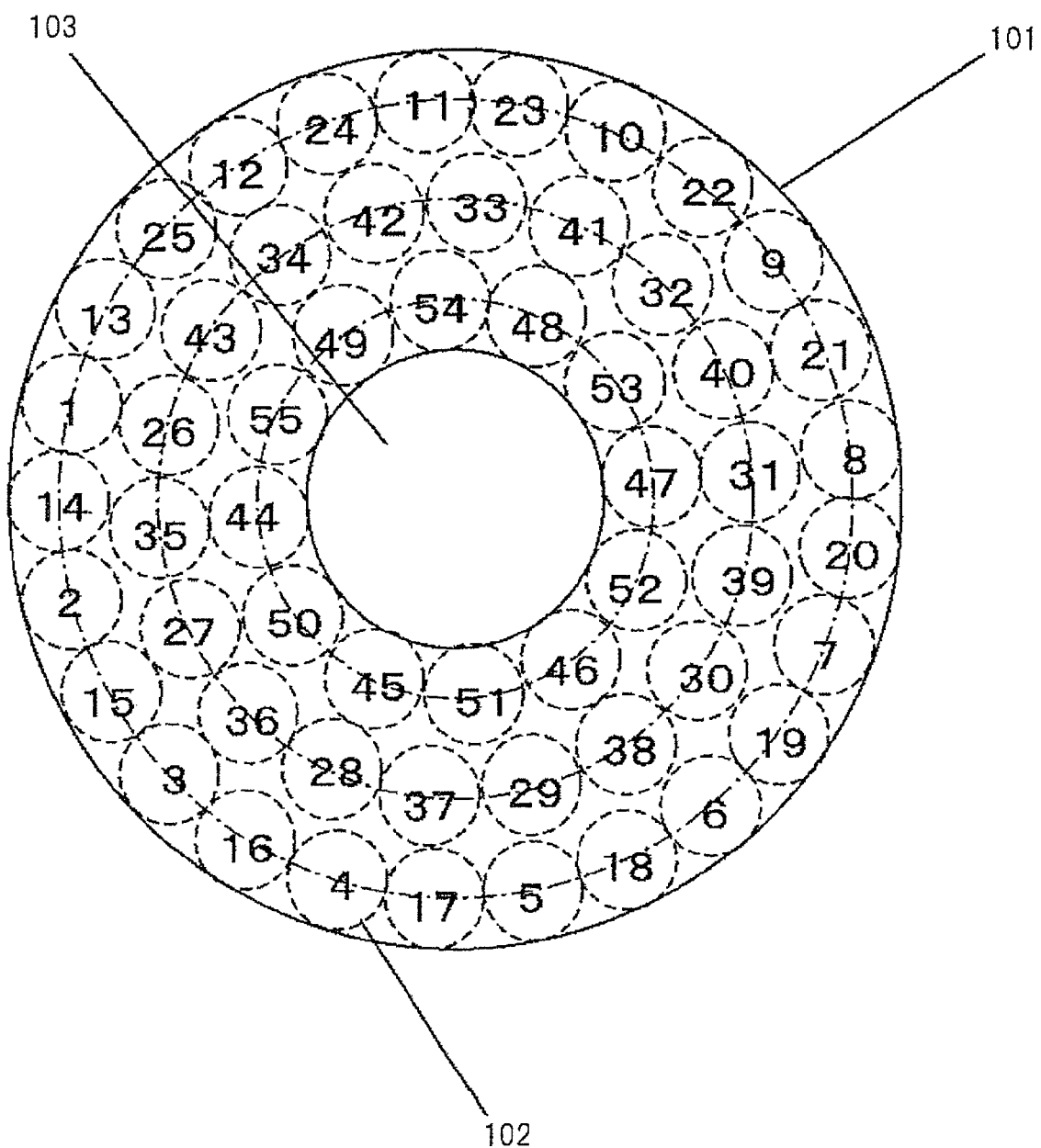
FIG. 3B is a plan view schematically showing the recording regions formed on the holographic recording medium and another example of their recording sequence to which the multiplexed holographic recording method according to the first embodiment is applied.

In FIG. 3A, holographic recording is performed sequentially in each of the recording regions that are adjacent to one another on the same circumference. Alternatively, holographic recording may be performed in every two or more of the recording regions that are arranged on the same circumference as shown in FIG. 3B. This method increases the degree of multiplexing even more uniformly on each circumference, and enables the recording regions to contract by even more uniform degrees as a result of photopolymerization.

Figure 5A:
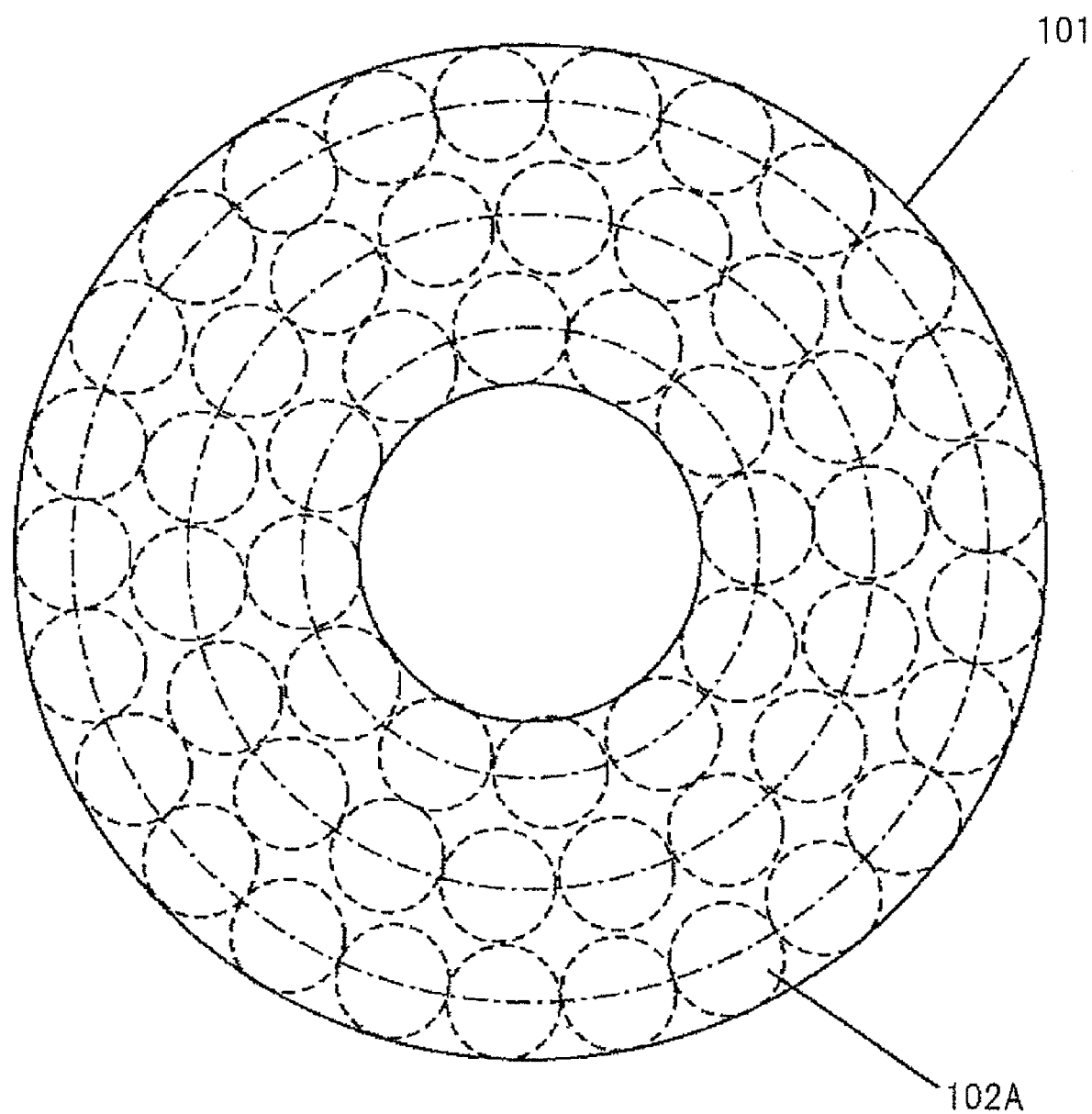
FIG. 5A is a plan view schematically showing recording regions in which holograms are written first when one hologram is recorded in each recording region of a holographic recording medium with a multiplexed holographic recording method according to a modification of the first embodiment.
Figure 5B:
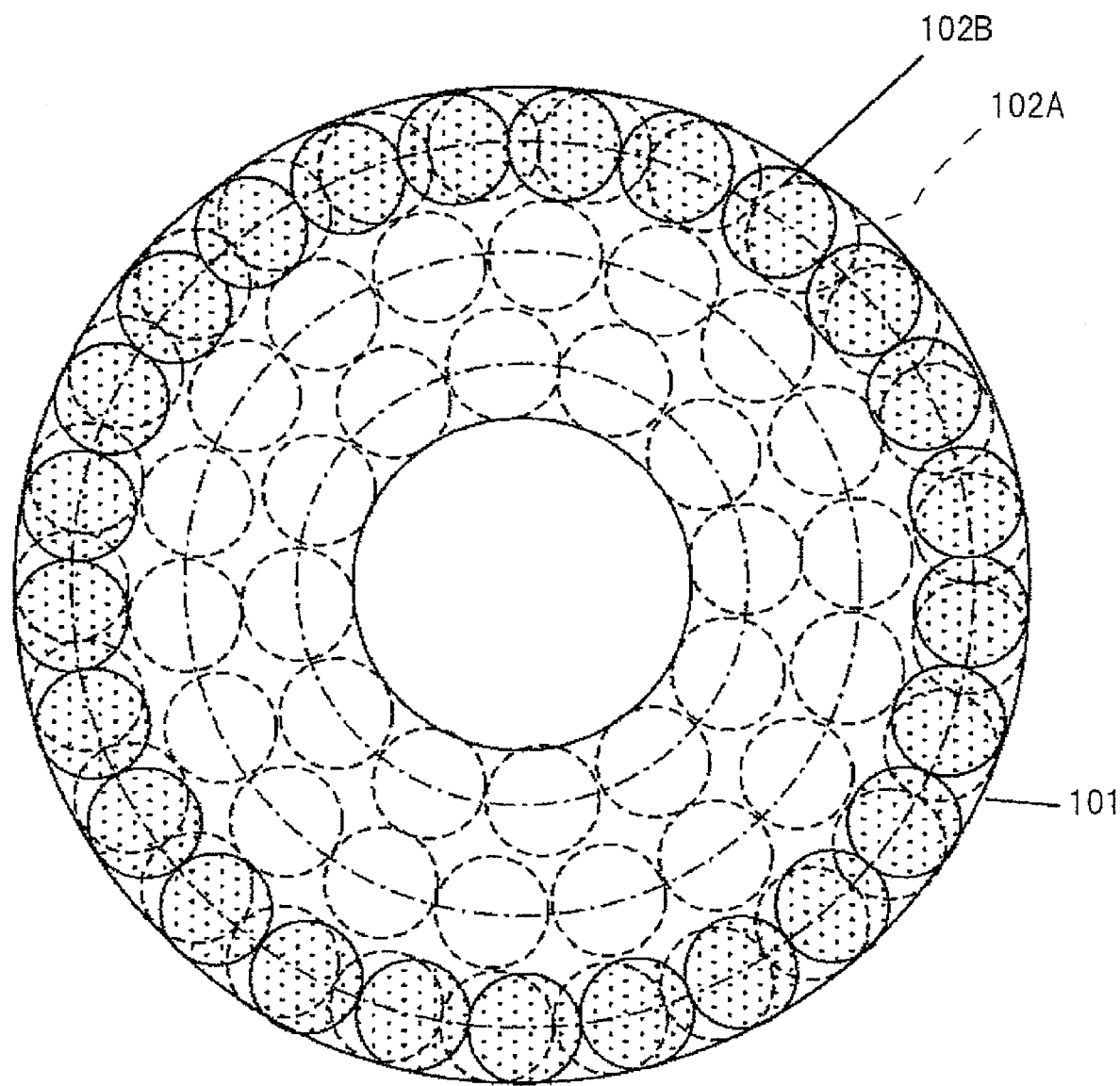
FIG. 5B is a plan view schematically showing recording regions in which holograms are written next on the holographic recording medium shown in FIG. 5A.

With the multiplexed holographic recording method according to the first embodiment of the present invention, the recording regions 102 of the recording medium 101 are not superimposed on one another as shown in FIG. 3A. However, the present invention should not be limited to this arrangement of the recording regions 102. Alternatively, for example, a plurality of other recording regions 102 may be superimposed on each recording region 102 as shown in FIG. 6A. In this case, the recording sequence described below is preferably employed. First, one hologram is recorded into each of the recording regions 102A that are adjacent to one another but are not superimposed on one another as shown in FIG. 5A using the reference beam with the same angle according to the same recording sequence as the recording sequence indicated by numerals 1 to 55 shown in FIG. 3A or 3B. After that, the angle of the reference beam is changed by at least the angular selectivity value. As shown in FIG. 5B, one hologram is then recorded into each of the recording regions 102B that are superimposed on the recording regions 102A in which holographic recording has been performed first but are not superimposed on one another according to the same recording sequence as the recording sequence shown in FIG. 3A. The same operation is repeated the number of times corresponding in one-to-one to the number of the other recording regions 102B that are to be superimposed on each recording region 102A until one hologram is recorded in each of all the recording regions of the recording medium 101. Following this, the second multiplexed holographic recording is performed in each recording region in the same manner as the first multiplexed holographic recording. The operation described above is repeated the number of times close to the maximum degree of multiplexing. In particular, N multiplexed holograms (where N≧1) are first recorded in each of the recording regions of the recording medium 101 and then the (N+1)th multiplexed recording is performed in each recording region. With this method, even when n other recording regions (where n=1, 2, . . . ) are superimposed on each recording region 102, a difference in the degree of multiplexing between the recording regions 102 does not exceed a predetermined value of n+1 throughout the entire recording medium 101. As a result, the degree of multiplexing increases substantially uniformly throughout the entire recording medium 101 when the recording regions are in the arrangement of the recording regions shown in FIG. 6A in the same manner as when the recording regions are in the arrangement shown in FIG. 3A. This method achieves a transfer rate higher than the transfer rate achieved by the conventional method. Thus, the recording regions contract by sufficiently uniform degrees. This method consequently achieves a sufficiently high recording quality of the recording medium 101.

With the multiplexed holographic recording method according to the first embodiment of the present invention, the plurality of recording regions 102 are arranged on the concentric circles as shown in FIG. 3A. However, the present invention should not be limited to this arrangement of the recording regions 102. Alternatively, the recording regions may be arranged spirally. In this case, the distance between each recording region and the center of the recording medium changes gradually in the radial direction of the recording medium. This arrangement enables the spot of the reference beam or the like to move from one recording region to another in the radial direction of the recording medium by a less amount of movement, and also enables the beam spot to move between the recording regions by a more uniform amount of movement.

With the multiplexed holographic recording method according to the first embodiment of the present invention, the plurality of recording regions 102 are arranged uniformly on the recording medium 101 as shown in FIG. 3A. However, the present invention should not be limited to this arrangement of the recording regions 102. Alternatively, the recording medium 101 may be divided in a plurality of independent zones 104 as shown in FIG. 6A. Here, a boundary 105 defined between the zones 104 is a non-recording region that does not overlap any recording region 102. The boundary 105 may include a physical partition. The dimensions of the zones 104 are determined in a manner that recording regions 102 included in each zone 104 are not distorted when recording regions 102 included in another zone 104 contract. Data recorded on the recording medium 101 is preferably recorded, or either erased or nullified in units of the zones 104. In this case, the multiplexed holographic recording method according to the first embodiment of the present invention sets the recording sequence separately for each individual zone 104. More specifically, the recording sequence for each zone 104 is set independently of the holographic recording state or the degree of multiplexing in other zones 104. In particular, N multiplexed holograms (where N≧1) are first recorded in each of the recording regions 102 included in each zone 104 and then the (N+1)th multiplexed holographic recording is performed in the recording regions 102 included in the same zone 104.

Figure 6B:
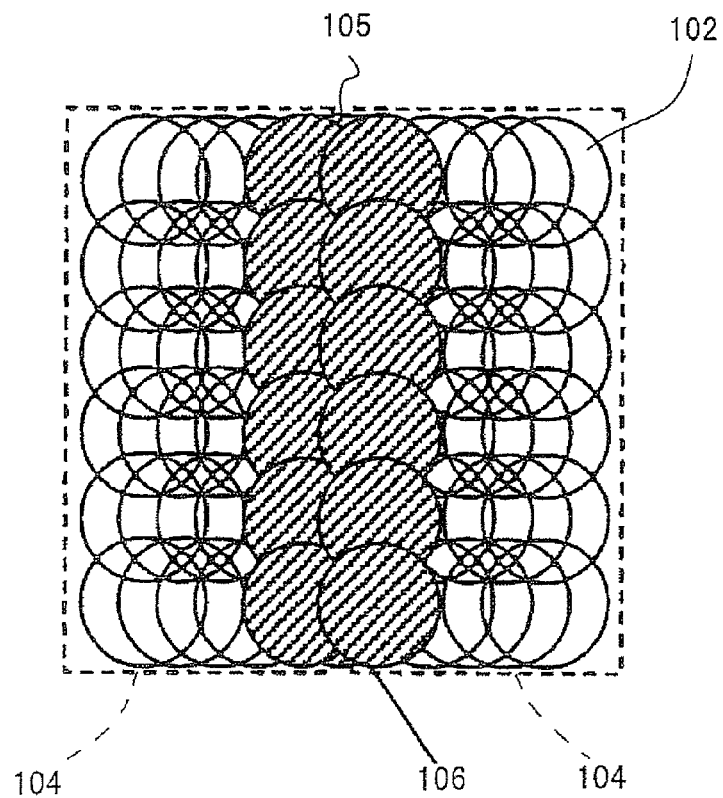
FIG. 6B is an enlarged plan view schematically showing a beam illuminating a non-recording region of the holographic recording medium shown in FIG. 6A.

Further, when holographic recording is performed in two adjacent zones 104 with relatively high degrees of multiplexing, the non-recording region 105 formed at the boundary of the two zones 104 may be illuminated with a predetermined signal beam and/or a reference beam as indicated by a shaded area 106 in FIG. 6B. Regions in each zone 104 that do not overlap any recording regions may also be illuminated with the predetermined signal beam and/or the reference beam. The predetermined signal beam is preferably a beam that does not contain two-dimensional data. More specifically, the predetermined signal beam is a beam that has been modulated uniformly by the spatial light modulator or a beam that has not been modulated at all. Illuminating the non-recording region with the signal beam or the reference beam reduces a difference in the degree of contraction between the non-recording region 105 and the recording regions 102 included in each zone 104, which occurs as a result of photopolymerization. This prevents the recording regions 102 from being distorted by such a difference in the degree of contraction between the non-recording region 105 and the recording regions 102, and prevents the diffraction efficiency of multiplexed holograms from decreasing and reproduction beam patterns from being distorted. As a result, this method achieves a high reproduction quality.

Figure 7A:
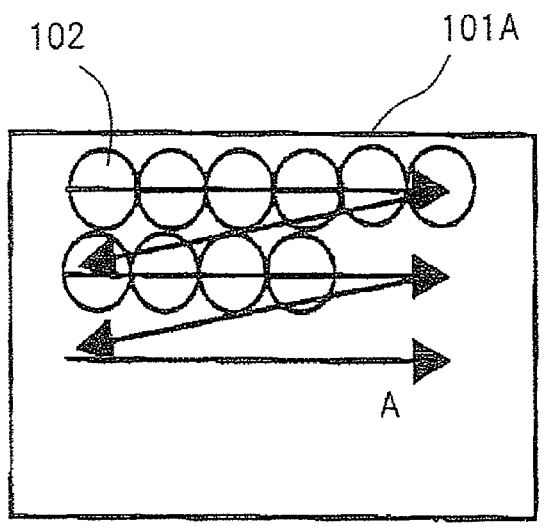
FIG. 7A is an enlarged plan view schematically showing one example of a recording sequence of recording regions that are formed on a rectangular holographic recording medium to which a multiplexed holographic recording method according to a modification of the first embodiment is applied.
Figure 7B:
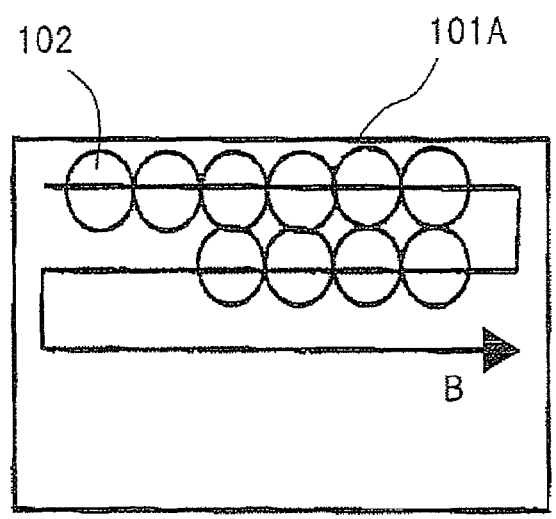
FIG. 7B is an enlarged plan view schematically showing another example of the recording sequence of the recording regions that are formed on the rectangular holographic recording medium to which the multiplexed holographic recording method according to the modification of the first embodiment is applied.
Figure 7C:
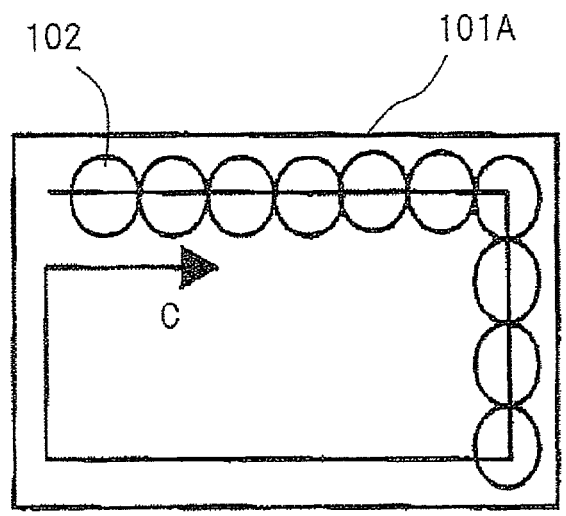
FIG. 7C is an enlarged plan view schematically showing still another example of the recording sequence of the recording regions that are formed on the rectangular holographic recording medium to which the multiplexed holographic recording method according to the modification of the first embodiment is applied.

The multiplexed holographic recording method according to the first embodiment of the present invention is applied to the holographic recording medium that is a disc medium. However, the present invention should not be limited to the disc-shaped holographic recording medium. Alternatively, the multiplexed holographic recording method according to the first embodiment of the present invention may be applied to a holographic recording medium 101A that is a rectangular recording medium or particularly a card medium as shown in FIGS. 7A, 7B, and 7C. In that case, a plurality of recording regions 102 are preferably arranged in a matrix. The spot of the reference beam or the like may move in the same direction in each row of the matrix as indicated by arrows A of FIG. 7A or may move in the opposite directions in alternate rows of the matrix as indicated by arrow B of FIG. 7B. Further, the spot of the reference beam or the like may move spirally from the outer circumference to the inner circumference of the matrix as indicated by arrow C of FIG. 7C. According to any of these recording sequences, N multiplexed holograms (where N≧1) are first recorded in each recording region 102 in an overall range of the recording medium 101A or in each of the recording regions 102 included in each zone, and then the (N+1)th multiplexed holographic recording is performed in each recording region 102 in the overall range of the recording medium 101A or each recording region 102 included in the same zone. This increases the degree of multiplexing substantially uniformly throughout the entire recording medium 101A, and consequently improves the transfer rate. Thus, the recording regions contract with sufficiently uniform degrees. This method consequently achieves a sufficiently high recording quality of the recording medium 101.

With the multiplexed holographic recording method according to the first embodiment of the present invention, the recording regions 102 are circular. However, the present invention should not be limited to such shapes of the recording regions 102. Alternatively, the recording regions may be in any shapes, such as rectangular shapes.

Further, the multiplexed holographic recording method according to the first embodiment of the present invention is applicable not only to the angle multiplexing described above but also to various other multiplexing methods including wavelength multiplexing, phase code multiplexing, peristrophic multiplexing, and polytopic multiplexing.

Second Embodiment

A multiplexed holographic recording method according to a second embodiment of the present invention differs from the method of the first embodiment in the angle of the reference beam set for each recording region. The other characteristics of the second embodiment (e.g. the structures of the holographic recording and reproduction apparatus and the holographic recording medium) are the same as the characteristics described in the first embodiment and will not be described in detail in the present embodiment.

With the multiplexed holographic recording method according to the second embodiment of the present invention, a plurality of recording regions 102 are formed on a recording medium 101 in the arrangement shown in FIG. 3A in the same manner as with the method of the first embodiment. The structure of the holographic recording medium 101 will not be described in detail in the present embodiment because it is the same as the structure described in the first embodiment. In particular, the recording medium 101 includes 55 recording regions 102, in each of which 100 multiplexed holograms are recorded with angle multiplexing. The method of the second embodiment employs the same recording sequence as the recording sequence indicated by numerals 1 to 55 in FIG. 3A that is employed in the first embodiment. Further, the angular selectivity value is assumed to be 0.05°.

The multiplexed holographic recording method according to the second embodiment of the present invention differs from the method of the first embodiment in that the angle of the reference beam is changed every time when the spot of the reference beam is moved from one recording region to another. The table in FIG. 8 shows the angle of the reference beam that is set differently for every holographic recording performed in each of the 55 recording regions 102 shown in FIG. 3A. In the table, $\theta_k$ is the angle of the reference beam set for the k-th recording region 102 (where k=1, 2, . . . , 55).

With the method of the second embodiment, the m-th holographic recording (where m=1, 2, . . . , 100) is first performed in the k-th recording region, holographic recording is next performed in other recording regions, and then the (m+1)th holographic recording is performed in the k-th recording region according to the recording sequence shown in FIG. 3A. In such holographic recording, the angle $\theta_1$ (where 1 ≠k) of the reference beam for the other recording regions is set between the angle $\theta_k(m)$ of the reference beam used for the m-th holographic recording performed in the k-th recording region and the angle $\theta k(m+1)$ of the reference beam used for the (m+1)th holographic recording performed in the k-th recording region. Thus, $\theta_k(m) \leq \theta_1 \leq \theta_k(m+1)$, or $\theta_k(m) \geq \theta_1 \geq \theta_k(m+1)$. The beam angle $\theta_1$ for 54 other recording regions is preferably set to increase monotonically or decrease monotonically in the sequence in which the holographic recordings are performed. Here, setting the beam angle to increase monotonically or decrease monotonically includes maintaining the beam angle to be unchanged from the angle used in the immediately preceding holographic recording (setting the angle $\theta_1$ for the other recording regions the same as either the angle $\theta_k(m)$ of the reference beam used in the m-th holographic recording performed in the k-th recording region or the angle $\theta_k(m+1)$ of the reference beam used in the (m+1)th holographic recording performed in the k-th recording region corresponds to the angle setting described in the first embodiment). The beam angle $\theta_1$ for the 54 other recording regions is more preferably set to increase or decrease by a value corresponding to a difference of 1/55 $((\theta_k(m+1)-\theta_k(m))/55)$ between the angle $\theta_k(m)$ of the reference beam used in the m-th holographic recording performed in the k-th recording region and the angle $\theta_k(m+1)$ of the reference beam used in the (m+1)th holographic recording performed in the k-th recording region. Here, the difference between the beam angle $\theta_k(m)$ used in the m-th holographic recording performed in the k-th recording region and the beam angle θ_k(m+1) used in the (m+1)th holographic recording performed in the k-th recording region is set at least greater than the angular selectivity value. In contrast, the beam angle differs between the two sequential holographic recordings by a value significantly smaller than the angular selectivity value. This shortens the time required to change the beam angle, and consequently shortens the entire recording time and improves the transfer rate. When the recording apparatus shown in FIG. 2 uses a pulse laser with a pulse width of 10 nanoseconds or less as its light source, the beam angle may be changed continuously. This further shortens the time required to change the beam angle, and stabilizes the operation of the drive system that changes the beam angle.

In the example shown in FIG. 8, the angle $\theta_1(1)$ of the reference beam for the first recording region 102, which is indicated by numeral 1 in FIG. 3A, is set at −2.5°. One hologram is recorded in the first recording region 102 using the reference beam with the set angle. After that, the angle of the reference beam is increased by 0.001°. At the same time, the recording medium 101 rotates at a high speed to move the spots of the signal beam and the reference beam to the recording region indicated by numeral 2 in FIG. 3A. As a result, the recording region is illuminated with the reference beam at the angle of −2.499°. One hologram is recorded in the recording region using the reference beam with the set angle. The same operation is repeated. With this method, one hologram is recorded into a next recording region every time when the angle of the reference beam is increased by 0.001°. After one hologram is recorded in the recording region indicated by numeral 55 in FIG. 3A using the reference beam with the angle of −2.446°, the angle of the reference beam is increased by 0.001° further. Then, another hologram is recorded into the first recording region using the reference beam with the angle of −2.445°. In the first recording region, the angle of the reference beam used to record the first hologram and the angle of the reference beam used to record the second hologram differ from each other by 0.055°, which is greater than the angular selectivity value of 0.05°. This angle setting eliminates crosstalk between the first and second holograms, which may occur when the holograms are read.

In the example shown in FIG. 8, the angle of the reference beam is set different for each recording region as well as for every holographic recording performed in each recording region. In particular, the angle of the reference beam set for one hologram recorded in the same recording region differs from the angle of the reference beam set for another hologram recorded in the recording region by 0.055°, which is greater than the angular selectivity value of 0.05°. This angle setting eliminates crosstalk between multiplexed holograms. Further, the beam angle differs between the two sequential holographic recordings by 0.001°, which is significantly smaller than the angular selectivity value of 0.05°. This shortens the time required to change the beam angle, and consequently shortens the entire recording time and improves the transfer rate.

The multiplexed holographic recording method according to the second embodiment of the present invention is also applicable to the recording medium 101 on which a plurality of other recording regions 102 are superimposed on each recording region 102 as shown for example in FIG. 6A. Alternatively, the recording regions may be arranged spirally. Further, the recording medium 101 may be divided in a plurality of independent zones 104 as shown in FIG. 6A. In this case, the recording sequence is set separately for each zone 104. Further, the multiplexed holographic recording method according to the second embodiment of the present invention is also applicable to the rectangular holographic recording medium 101A shown in FIGS. 7A, 7B, and 7C.

Third Embodiment

A multiplexed holographic recording method according to a third embodiment of the present invention differs from the method of the first embodiment in the recording sequence. The other characteristics of the third embodiment (e.g. the structures of the holographic recording and reproduction apparatus and the holographic recording medium) are the same as the characteristics described in the first embodiment and will not be described in detail in the present embodiment.

Figure 9A:
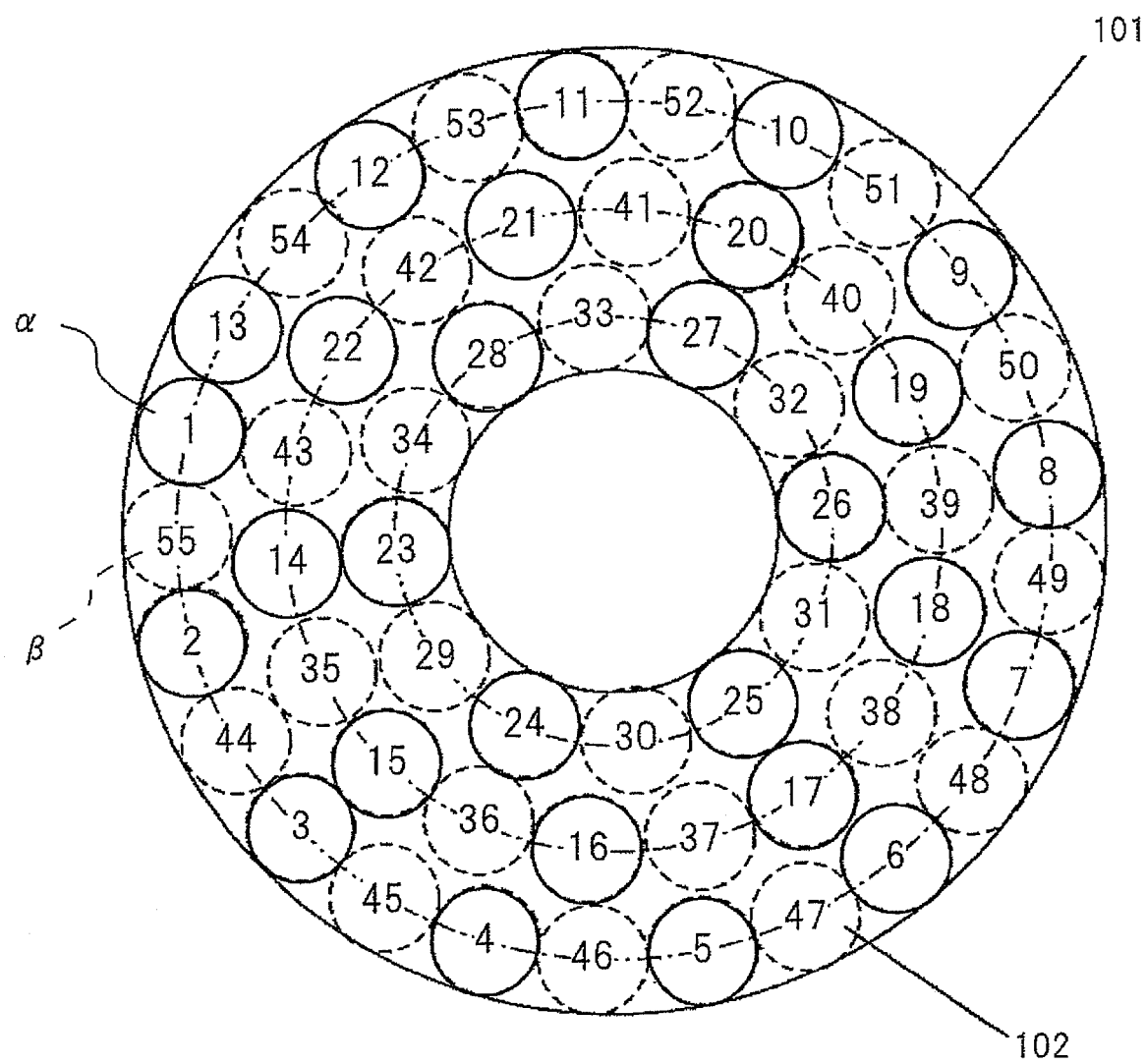
FIG. 9A is a plan view schematically showing recording regions formed on a holographic recording medium and one example of their recording sequence to which a multiplexed holographic recording method according to a third embodiment of the present invention is applied.
Figure 9B:
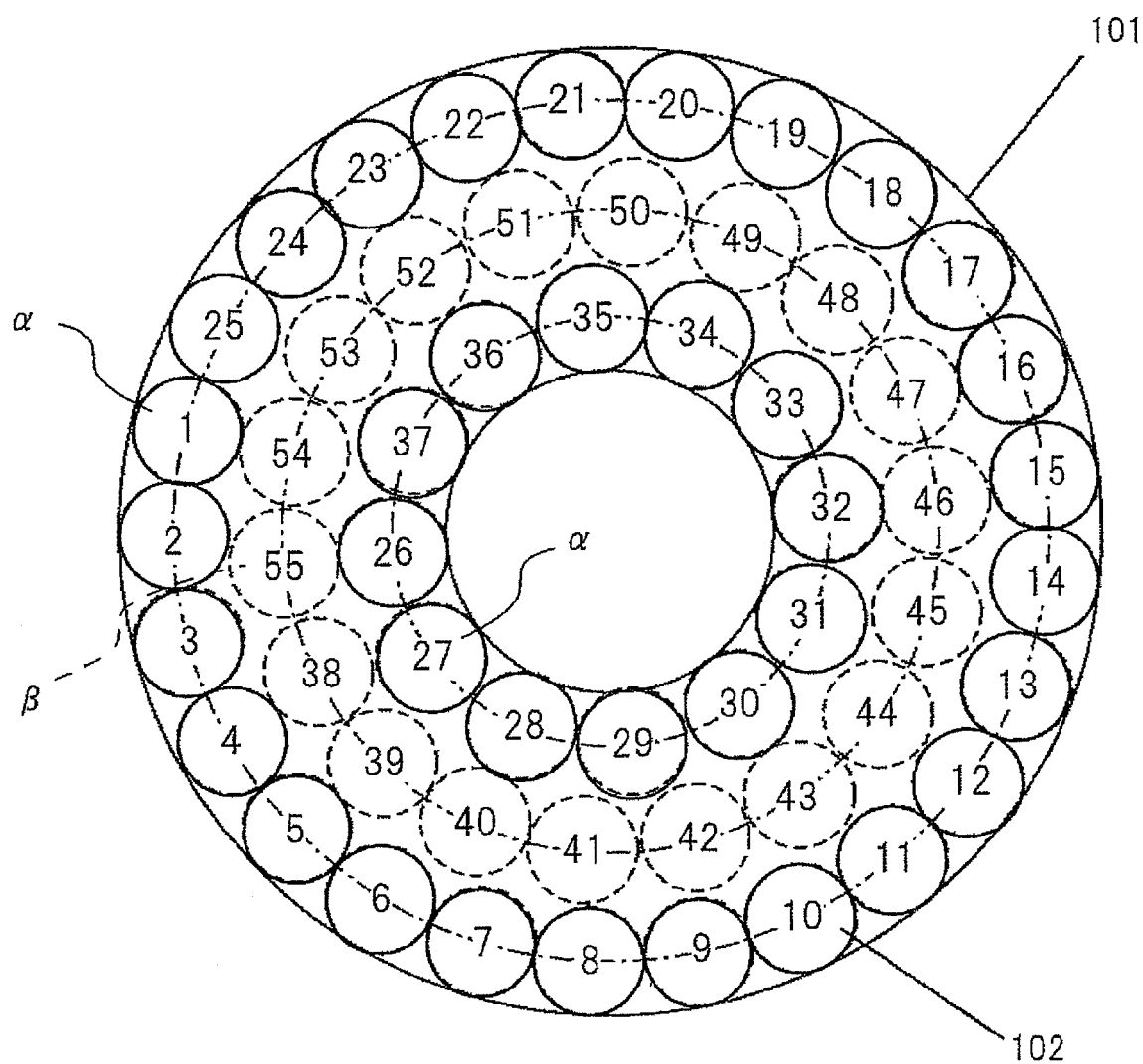
FIG. 9B is a plan view schematically showing recording regions formed on the holographic recording medium and another example of their recording sequence to which the multiplexed holographic recording method according to the third embodiment is applied.

With the multiplexed holographic recording method according to the third embodiment of the present invention, a plurality of recording regions 102 are formed on concentric circles on a recording medium 101 in a manner that the recording regions 102 are not superimposed on one another as shown in FIGS. 9A and 9B. The structure of the holographic recording medium 101 will not be described in detail in the present embodiment because it is the same as the structure described in the first embodiment. In particular, the recording medium 101 includes 55 recording regions 102, in each of which 100 multiplexed holograms are recorded with angle multiplexing. Further, the angular selectivity value is assumed to be 0.05°.

FIG. 9A shows one example recording sequence indicated by numerals 1 to 55, which is employed by the multiplexed holographic recording method according to the third embodiment of the present invention. According to this recording sequence, holographic recording in one recording region 102 is first completed, and then a recording region that is different from a recording region adjacent to the recording region 102 in which holographic recording has been completed is selected as a target recording region for a next holographic recording. More specifically, one recording region in every two of the recording regions on the same circumference is selected. Here, one recording region in every three or more of the recording regions may be selected as a target recording region.

In FIG. 9A for example, when multiplexed holographic recording has been performed (m−1) times (where m=1, 2, . . . ) in each of all the recording regions 102 of the recording medium 101, the m-th multiplexed holographic recording is first performed in the first recording region 102 indicated by numeral 1, which is on the outermost circumference of the recording medium 101. Then, the m-th multiplexed holographic recording is performed in another recording region that is circumferentially away from the first recording region 102 by the distance corresponding to the diameter of the recording region 102 (the region indicated by numeral 2). In the same manner, the m-th multiplexed holographic recording is performed in every two of the recording regions that are arranged on the outermost circumference. As a result, the recording regions that are arranged on the outermost circumference of the recording medium 101 are divided into a group of recording regions 1 to 13 in which the m-th multiplexed holographic recording has been performed (first recording region group a) and a group of recording regions 44 to 55 in which only up to the (m−1)th multiplexed holographic recording has been performed (second recording region group β). After that, the spots of the signal beam and the reference beam move in a direction toward the inner circumference of the recording medium 101, and the m-th multiplexed holographic recording is performed again in every two of the recording regions that are arranged on the first circumference inside the outermost circumference. This operation is repeated until the recording regions arranged on each of all the circumferences from the outermost circumference to the innermost circumference are divided into the first recording region group α and the second recording region group β. After that, the m-th multiplexed holographic recording is performed in the recording regions included in the second recording region group β that are arranged on the innermost circumference. As a result, m multiplexed holograms are uniformly recorded in each of all the recording regions on the innermost circumference. The spot of the reference beam or the like then moves in a direction toward the outer circumference of the recording medium 101. The m-th multiplexed holographic recording is then performed in the recording regions included in the second recording region group β that are arranged on the first circumference outside the innermost circumference. This operation is repeated until m multiplexed holograms are uniformly recorded in each of all the recording regions arranged on all the circumferences from the innermost circumference to the outermost circumference.

The recording sequence shown in FIG. 9A differs from the recording sequence shown in FIG. 3A that is employed in the first embodiment in that multiplexed holographic recording is repeated both when the spot of the reference beam or the like moves in the direction from the outer circumference to the inner circumference of the recording medium 101 and when the beam spot moves in the opposite direction. More specifically, unlike with the method of the first embodiment, the recording head is moved from the inner circumference back to the outer circumference while holographic recording is being performed. This shortens the seek time required in the radial direction of the recording medium 101. Further, the target recording region is selected from the first recording region group α when multiplexed holographic recording is repeated while the beam spot is moving in the direction from the outer circumference to the inner circumference of the recording medium 101. The target recording region is selected from the second recording region group β when multiplexed holographic recording is repeated while the beam spot is moving from the inner circumference to the outer circumference. This increases the degree of multiplexing in each recording region uniformly throughout the entire recording medium 101. In particular, a difference in the degree of multiplexing between recording regions in the first recording region group α and the second recording region group β that are at the same distance from the center of the recording medium 101 does not exceed 1. In this case, the recording regions contract by substantially uniform degrees. This prevents the diffraction efficiency of multiplexed holograms from decreasing, and achieves a high recording and reproduction quality.

FIG. 9B shows another example recording sequence indicated by numerals 1 to 55, which is employed by the multiplexed holographic recording method according to the second embodiment of the present invention. According to this recording sequence, the circumferences on which recording regions are selected as target recording regions differ from each other between when the spot of the reference beam or the like moves in the direction from the outer circumference to the inner circumference and when the beam spot moves in the opposite direction. In FIG. 9B for example, the m-th multiplexed holographic recording is performed in the recording regions that are arranged on the outermost circumference according to the sequence indicated by numerals 1 to 25. After that, the spot of the reference beam or the like moves in the direction toward the inner circumference of the recording medium 101, and the m-th multiplexed holographic recording is performed in the recording regions that are arranged on the second circumference inside the outermost circumference (or specifically the recording regions that are arranged on the innermost circumference) according to the sequence indicated by numerals 26 to 37. This operation is repeated until the rows of the recording regions that are arranged on all the circumferences from the outermost circumference to the innermost circumference are divided into the first recording region group α and the second recording region group β. After that, the m-th holographic recording is performed in the recording regions included in the second recording region group β that are arranged on every two of the circumferences from the circumference closest to the innermost circumference. The operation described above is repeated until m multiplexed holograms are uniformly recorded in each of all the recording regions that are arranged on all the circumferences from the innermost circumference to the outermost circumference.

The recording sequence shown in FIG. 9B differs from the recording sequence shown in FIG. 3A that is employed in the first embodiment in that multiplexed holographic recording is repeated both when the spot of the reference beam or the like moves in the direction from the outer circumference to the inner circumference of the recording medium 101 and when the beam spot moves in the opposite direction. More specifically, unlike with the method of the first embodiment, the recording head is moved from the inner circumference back to the outer circumference while holographic recording is being performed. This shortens the seek time required in the radial direction of the recording medium 101. Further, the target recording region is selected from the first recording region group α when multiplexed holographic recording is repeated while the beam spot is moving in the direction from the outer circumference to the inner circumference of the recording medium 101. The target recording region is selected from the second recording region group β when multiplexed holographic recording is repeated while the beam spot is moving in the direction from the inner circumference to the outer circumference. This increases the degree of multiplexing in each recording region uniformly throughout the entire recording medium 101. In particular, recording regions in the first recording region group α and the second recording region group β that are at the same distance from the center of the recording medium 101 have the same degrees of multiplexing. In this case, the recording regions contract by substantially uniform degrees. This prevents the diffraction efficiency of multiplexed holograms from decreasing, and achieves a high recording and reproduction quality.

In either FIG. 9A or 9B, the angle of the reference beam may be unchanged for each recording region while the m-th holographic recording is being performed in each recording region like in the first embodiment. Like in the second embodiment, the angle of the reference beam $\theta_l$ (where $l \neq k$) for the 54 other recording regions performed between the m-th holograph recording in the k-th recording region (where k=1, 2, ..., 55) and the (m+1)th holographic recording in the k-th recording region is preferably set to increase monotonically or decrease monotonically in the sequence in which the holographic recordings are performed. The beam angle $\theta_l$ for the 54 other recording regions is more preferably set to increase or decrease by a value corresponding to a difference of 1/55 $((\theta_k(m+1)-\theta_k(m))/55)$ between the angle $\theta_k(m)$ of the reference beam used in the m-th holographic recording performed in the k-th recording region and the angle $\theta_k(m+1)$ of the reference beam used in the (m+1)th holographic recording performed in the k-th recording region. Here, the difference between the beam angle $\theta_k(m)$ used in the m-th holographic recording performed in the k-th recording region and the beam angle $\theta_k$ (m+1) used in the (m+1)th holographic recording performed in the k-th recording region is set at least greater than the angular selectivity value. In contrast, the beam angle differs between the two sequential holographic recordings by a value significantly smaller than the angular selectivity value. This shortens the time required to change the beam angle, and consequently shortens the entire recording time and improves the transfer rate. When the recording apparatus shown in FIG. 2 uses a pulse laser with a pulse width of 10 nanoseconds or less as its light source, the beam angle may be changed continuously. This further shortens the time required to change the beam angle, and stabilizes the operation of the drive system that changes the beam angle.

With the multiplexed holographic recording method according to the third embodiment of the present invention, the m-th holographic recording is first performed in the recording regions that are on the outermost circumference as shown in FIGS. 9A and 9B. However, the m-th holographic recording may be first performed in the recording regions that are on the innermost circumference. This method also has the same advantages as the method described above. Alternatively, the recording regions may be arranged spirally. Further, the recording medium 101 may be divided in a plurality of independent zones 104 as shown in FIG. 6A. In this case, the recording sequence shown in FIG. 9A or 9B is set separately for each zone 104.

The multiplexed holographic recording method according to the third embodiment of the present invention has been applied to the holographic recording medium that is a disc medium. However, the present invention should not be limited to the disc-shaped holographic recording medium. Alternatively, the multiplexed holographic recording method according to the third embodiment of the present invention may be applied to the holographic recording medium 101A that is a rectangular recording medium or particularly a card medium as shown in FIGS. 7A, 7B, and 7C. In that case, a plurality of recording regions 102 are preferably arranged in a matrix. The spot of the reference beam or the like may move in the same direction in each row of the matrix as indicated by arrows A of FIG. 7A or may move in the opposite directions in alternate rows of the matrix as indicated by arrow B of FIG. 7B. Further, the spot of the reference beam or the like may move spirally from the outer circumference to the inner circumference of the matrix as indicated by arrow C of FIG. 7C. According to any of these recording sequences, the m-th holographic recording may be performed in every two or more of the recording regions in the first scanning, and then the m-th holographic recording may be performed in the remaining recording regions in the next scanning. Alternatively, the m-th holographic recording may be performed in every predetermined number of rows of the matrix or in every predetermined number of columns of the matrix.

With the multiplexed holographic recording method according to the third embodiment of the present invention, a plurality of other recording regions may be superimposed on each recording region as shown for example in FIG. 6A. In this case, the recording sequence described below is preferably employed. First, one hologram is recorded into each of the recording regions 102A that are adjacent to one another but are not superimposed on one another as shown in FIG. 5A according to the recording sequence shown in FIG. 9A or 9B. After that, as shown in FIG. 5B, one hologram is then recorded into each of the recording regions 102B that are superimposed on the recording regions 102A in which holographic recording has been performed first but are not superimposed on one another according to the same recording sequence as the recording sequence shown in FIG. 9A or 9B. The same operation is repeated the number of times corresponding in one-to-one to the number of the other recording regions 102B that are to be superimposed on each recording region 102A until one hologram is recorded in each of all the recording regions 102 of the recording medium 101. Following this, the second multiplexed holographic recording is performed in each recording region in the same manner as the first multiplexed holographic recording. The operation described above is repeated the number of times close to the maximum degree of multiplexing. With this method, even when n other recording regions (where n=1, 2, . . . ) are superimposed on each recording region 102, a difference in the degree of multiplexing between the recording regions 102 does not exceed a predetermined number of n+1 throughout the entire recording medium 101. As a result, the degree of multiplexing increases substantially uniformly throughout the entire recording medium 101 when the recording regions are in the arrangement shown in FIG. 6A in the same manner as when the recording regions are in the arrangements shown in FIGS. 9A and 9B. This method achieves a transfer rate higher than the transfer rate achieved by the conventional method. In this case, the recording regions contract by sufficiently uniform degrees. This method consequently achieves a sufficiently high recording quality of the recording medium 101.

According to the recording sequence shown in FIG. 9A, the recording regions arranged on the same circumference are divided into the first recording region group $\alpha$ and the second recording region group $\beta$ in a manner that each group includes substantially the same number of recording regions. Here, the recording regions may be divided into the first recording region group $\alpha$ and the second recording region group $\beta$ in a manner that each group includes a different number of recording regions. The recording regions in the first recording region group $\alpha$ and the recording regions in the second recording region group $\beta$ are only required to be distributed substantially uniformly on the same circumference.

Fourth Embodiment

A multiplexed holographic recording method according to a fourth embodiment of the present invention differs from the method of the first embodiment in that the maximum degree of multiplexing is extremely high. The other characteristics of the fourth embodiment (e.g. the structures of the holographic recording and reproduction apparatus and the holographic recording medium) are the same as the characteristics described in the first embodiment and will not be described in detail in the present embodiment.

With the multiplexed holographic recording method according to the fourth embodiment of the present invention, a plurality of recording regions 102 are formed on concentric circles on a recording medium 101 in a manner that the recording regions 102 are not superimposed on one another. The structure of the holographic recording medium 101 will not be described in detail in the present embodiment because it is the same as the structure described in the first embodiment. Unlike the recording medium 101 of the first embodiment, 1000 multiplexed holograms are recorded in each recording region 102 with angle multiplexing. In other words, the maximum degree of multiplexing is extremely high unlike with the method of the first embodiment. In this case, a difference in the degree of contraction between the recording regions 102 is reduced to a permissible level even when a difference in the degree of multiplexing between the two recording regions 102 of the recording medium 101 is set to exceed 1. The following explains this. Under the same M/# value, the diffraction efficiency per hologram recorded on the recording medium is lower or the refractive index differs less between the recording regions as the degree of multiplexing of the recording medium is higher. When the diffraction efficiency is lower and the refractive index differs less, the amount of laser light required per holographic recording is smaller. Accordingly, the recording regions contract less when illuminated with the laser light. As a result, even when the difference in the degree of multiplexing between the recording regions 102 exceeds 1 or increases to a certain value exceeding 1, a difference in the degree of contraction between the recording regions 102, which is determined by the difference in the degree of multiplexing between the recording regions 102, is reduced to a level that does not degrade the recording quality.

Through experiments, the inventors of the present application have determined a permissible level of the difference in the degree of multiplexing between the recording regions that does not affect the characteristics of the recording medium 101. A lowest permissible level M of the degree of multiplexing is $M=a*0.8$, where a is the maximum number of multiplexed holograms recorded in each recording region 102 of the recording medium 101 (where $a \geq 10$). More specifically, when multiplexed holographic recording is performed M times (where $M \geq 8$) in each recording region, multiplexed holographic recording needs to be first performed $N=M*0.25$ times (where $N \geq 2$) in each recording region and then the (N+1)th holographic recording needs to be performed in each recording region. In particular, when the maximum degree of multiplexing is 1000 times, the degree of multiplexing may vary between 800 and 1000 depending on each recording region without changing the characteristics of the recording medium 101. Thus, as long as the above condition is satisfied, multiplexed holographic recording in the recording regions 102 is performed using only the circumferential movement of the beam that requires less time than the radial movement of the beam on the recording medium 110. This method consequently improves the transfer rate further.

The multiplexed holographic recording method according to the fourth embodiment of the present invention is applicable to the recording medium 101 on which a plurality of other recording regions 102 are superimposed on each recording region 102 as shown for example in FIG. 6A. Alternatively, the recording regions may be arranged spirally. Further, the recording medium 101 may be divided in a plurality of independent zones 104 as shown in FIG. 6A. In that case, the recording sequence is set separately for each zone 104. Further, the multiplexed holographic recording method according to the fourth embodiment of the present invention is applicable to the rectangular holographic recording medium 101A shown in FIGS. 7A, 7B, and 7C.

Fifth Embodiment

A holographic reproduction method according to a fifth embodiment of the present invention is applicable to a recording medium on which holograms have been recorded with the multiplexed holographic recording method according to any of the first to fourth embodiments. The characteristics of the fifth embodiment including the structures of the holographic recording and reproduction apparatus and the holographic recording medium are the same as the characteristics described in the first embodiment (see FIGS. 2, 3A, and 3B) and will not be described in detail in the present embodiment.

As described above, multiplexed holographic recording is repeated in the recording regions 102 of the holographic recording medium 101 in the recording sequence indicated by numerals 1 to 55 shown in FIG. 3A or 3B in the first embodiment. The holographic reproduction method according to the fifth embodiment sets the reproduction sequence of the recording regions 102 of the recording medium 101 identical to the recording sequence shown in FIG. 3A or 3B. This method enables data to be read at a high transfer rate.

For example, 100 multiplexed holograms have been recorded in each of 55 recording regions 102 shown in FIG. 3A or 3B. In particular, with the multiplexed holographic recording method of the first embodiment, the angle of each reference beam does not differ between the recording regions 102. With the holographic reproduction method according to the fifth embodiment, the angle of the readout beam is first set to substantially coincide with the angle of one of the reference beams used for recording, and the readout beam with the set angle is used to reproduce one hologram after another according to the sequence indicated by numerals 1 to 55 shown in FIG. 3A. In particular, the angle of each readout beam does not differ between these reproductions. With this method, the operation of rotating the recording medium 101 requires less time and the operation of moving the reproduction head in the radial direction of the recording medium 101 requires less time. When the reproduction apparatus shown in FIG. 2 uses a pulse laser having a pulse width of 10 nanoseconds or less as its light source, the recording medium 101 may rotate continuously and the reproduction head may move continuously between these reproductions. After one hologram is reproduced from each of all the 55 recording regions 102, the angle of the readout beams is changed to substantially coincide with the angle of another one of the reference beams used for recording. One hologram is then reproduced from each of all the 55 recording regions 102 using the readout beam with the set angle according to the sequence indicated by numerals 1 to 55 shown in FIG. 3A. The operation described above is repeated 100 times. In particular, after N (where $N \geq 1$) holograms are reproduced from each of the recording regions 102 included in the recording medium 101, the (N+1)th hologram is reproduced from each recording region 102. As compared with the conventional reproduction method, this method significantly reduces the time required to move the spot of the readout beam between the recording regions, the time required to rotate the mirror, and the time required to brake the mirror against relaxation oscillation of the mirror with respect to the entire reproduction time. As a result, this method significantly improves the transfer rate as compared with the conventional reproduction method. The recording medium 101 may be rotated, for example, at 4000 to 8000 rpm. In this case, the time required to move the spot of the readout beam between the recording regions 102 that are on the adjacent two of all the circumferences from the outermost circumference to the innermost circumference is as short as about 10 microseconds. Further, the total rotation time of the mirror required in the entire holographic reproduction is as short as 49.5 milliseconds. As a result, the entire seek time is as short as 60 milliseconds, which even includes the time required to brake the mirror. Further, with the holographic reproduction method according to the fifth embodiment of the present invention, the seek time increases much less even when the degree of multiplexing increases or the number of recording regions 102 increases as compared with when the conventional method is used. The holographic reproduction method according to the fifth embodiment of the present invention enables holograms, which have been recorded with the multiplexed holographic recording method of the first embodiment, to be reproduced at a high transfer rate. The holographic reproduction method according to the fifth embodiment of the present invention is also applicable to the recording medium on which holograms have been recorded with the multiplexed holographic recording method according to the fourth embodiment of the present invention.

The holographic reproduction method according to the fifth embodiment of the present invention is applicable to the recording medium on which 100 holograms have been recorded with the multiplexed holographic recording method of the first embodiment of the present invention in each of the recording regions 102 that are superimposed on one another as shown in FIG. 6A for example. In this case, the reproduction sequence is set identical to the recording sequence. More specifically, one hologram is reproduced using the readout beam with the same angle from each of the recording regions 102A that are adjacent to one another but are not superimposed on one another as shown in FIG. 5A according to the same sequence as the sequence indicated by numerals 1 to 55 shown in FIG. 3A or 3B. Then, the angle of the readout beam is changed, and one hologram is reproduced from each of the recording regions 102B that are superimposed on the recording regions 102A in which the holographic reproduction has been performed first but are not superimposed on one another as shown in FIG. 5B. The same operation is repeated the number of times corresponding in one-to-one to the number of the other recording regions 102B that are superimposed on each recording region 102A until one hologram is reproduced from each of all the recording regions of the recording medium 101. The second holographic reproduction is then performed in each recording region in the same manner as the first holographic reproduction. The operation described above is repeated 100 times. In particular, N holograms (where N≧1) are first reproduced from each of the recording regions of the recording medium 101, and then the (N+1)th hologram is reproduced from each recording region. This method enables the holograms to be reproduced at a high transfer rate from the recording regions in the arrangement shown in FIG. 6A.

With the holographic reproduction method according to the fifth embodiment of the present invention, the plurality of recording regions may not be arranged on the concentric circles as shown in FIG. 3A but may be arranged spirally. In this case, the distance between each recording region and the center of the recording medium changes gradually in the radial direction of the recording medium. This arrangement enables the spot of the readout beam to move from one recording region to another in the radial direction of the recording medium by a less amount of movement, and also enables the beam spot to move between the recording regions by a more uniform amount of movement.

With the holographic reproduction method according to the fifth embodiment of the present invention, the recording medium 101 may be divided in a plurality of independent zones 104 as shown in FIG. 6A. In this case, the reproduction sequence is set separately for each zone 104. More specifically, the reproduction sequence for each zone 104 is set identical to the recording sequence set separately for each zone 104.

The holographic reproduction method according to the fifth embodiment of the present invention may be applied to the holographic recording medium 101A that is a rectangular medium or particularly a card medium as shown in FIGS. 7A, 7B, and 7C. In that case, a plurality of recording regions 102 are preferably arranged in a matrix. The spot of the readout beam may move in the same direction in each row of the matrix as indicated by arrows A in FIG. 7A according to the recording sequence, or may move in the opposite directions in alternate rows of the matrix as indicated by arrow B in FIG. 7B. Further, the spot of the readout beam may move spirally from the outer circumference toward the inner circumference of the matrix as indicated by arrow C in FIG. 7C. Any of these reproduction sequences improves the transfer rate.

With the holographic reproduction method according to the fifth embodiment of the present invention, the recording regions may not be circular but may be in any shapes, such as rectangular shapes.

To reproduce multiplexed holograms recorded in each recording region according to the recording sequence that is employed in the second embodiment of the present invention, the reproduction sequence is set identical to the recording sequence in the manner described below. This method enables data to be reproduced at a high transfer rate. With this method, the m-th holographic reproduction (where m=1, 2, . . . , 100) from the k-th recording region is first performed, holographic reproduction from other recording regions is next performed, and the (m+1)th holographic reproduction from the k-th recording region is then performed according to the sequence indicated by numerals 1 to 55 shown in FIG. 3A or 3B. In such holographic reproduction, the angle $\theta_1$ (where $1 \neq k$) of the readout beam for the other recording regions is set between the angle $\theta_k(m)$ of the readout beam used for the m-th holographic reproduction from the k-th recording region and the angle $\theta_k(m+1)$ of the readout beam used for the (m+1)th holographic reproduction from the k-th recording region. Thus, $\theta_k(m) \leq \theta_1 \leq \theta_k(m+1)$, or $\theta_k(m) \leq \theta_1 \leq \theta_k(m+1)$. The beam angle $\theta_1$ for 54 other recording regions is preferably set to increase monotonically or decrease monotonically in the sequence in which the holographic reproductions are performed. Here, setting the beam angle to increase monotonically or decrease monotonically includes maintaining the beam angle to be unchanged from the angle used in the immediately preceding reproduction. The beam angle $\theta_1$ for the 54 other recording regions is more preferably set to increase or decrease by a value corresponding to a difference of 1/55 (($\theta_k(m+1) - \theta_k(m))/55$) between the angle $\theta_k(m)$ of the readout beam used in the m-th holographic reproduction from the k-th recording region and the angle $\theta_k(m+1)$ of the readout beam used in the (m+1)th holographic reproduction from the k-th recording region. Here, the difference between the beam angle $\theta_k(m)$ used in the m-th holographic reproduction from the k-th recording region and the beam angle $\theta_k(m+1)$ used in the (m+1)th holographic reproduction from the k-th recording region is set at least greater than the angular selectivity value. In contrast, the beam angle differs between the two sequential holographic reproductions by a value significantly smaller than the angular selectivity value. This shortens the time required to change the beam angle, and consequently shortens the entire reproduction time and improves the transfer rate. When the reproduction apparatus shown in FIG. 2 uses a pulse laser with a pulse width of 10 nanoseconds or less as its light source, the beam angle may be changed continuously. This further shortens the time required to change the beam angle, and stabilizes the operation of the drive system that changes the beam angle.

To reproduce multiplexed holograms recorded in each recording region according to the recording sequence shown in FIG. 9A or 9B that is employed in the third embodiment of the present invention, the reproduction sequence is set identical to the recording sequence in the manner described below. This method enables data to be reproduced at a high transfer rate. To reproduce the holograms recorded according to the recording sequence shown in FIG. 9A, the recording regions arranged on each circumference are divided into a first recording region group α and a second recording region group β in the reproduction sequence in a manner that one recording region in every two of the recording regions that are arranged on each circumference is in one of the first and second recording region groups α and β and the remaining recording regions that are arranged on the same circumference are in the other one of the first and second recording region groups α and β. To reproduce the holograms recorded according to the recording sequence shown in FIG. 9B, the recording regions arranged on all the circumferences from the outermost circumference to the innermost circumference are divided into a first recording region group α and a second recording region group β in the reproduction sequence in a manner that the recording regions that are arranged on every two rows are in one of the first and second recording region groups α and β and the recording regions that are arranged on the remaining circumferences are in the other one of the first and second recording region groups α and β. According to any of these reproduction sequences, holograms are reproduced from the first recording region group α while the spot of the readout beam is moving in the direction from the outer circumference to the inner circumference of the recording medium 101 and holograms are reproduced from the second recording region group β while the spot of the readout beam is moving in the opposite direction. This method enables holographic reproduction to be repeated when the reproduction head moves radially in any of the two directions on the recording medium 101, and shortens the seek time required in the radial direction of the recording medium 101.

In any of FIGS. 9A and 9B, the angle of the readout beam may be maintained unchanged while the m-th holographic reproduction is being performed in each recording region. The angle $\theta_l$ (where $l \ne k$) of the readout beam may be preferably set to increase monotonically or decrease monotonically in holographic reproduction from the 54 other recording regions, which is performed between the m-th holographic reproduction and the (m+1)th holographic reproduction from the k-th recording region (where k=1, 2, . . . , 55). The beam angle $\theta_l$ for the 54 other recording regions is more preferably set to increase or decrease by a value corresponding to a difference of 1/55 (($\theta_k$(m+1)−$\theta_k$(m))/55) between the angle $\theta_k$(m) of the readout beam used in the m-th holographic reproduction from the k-th recording region and the angle $\theta_k$(m+1) of the readout beam used in the (m+1)th holographic reproduction from the k-th recording region. Here, the difference between the beam angle $\theta_k$(m) used in the m-th holographic reproduction from the k-th recording region and the beam angle $\theta_k$(m+1) used in the (m+1)th holographic reproduction from the k-th recording region is set at least greater than the angular selectivity value. In contrast, the beam angle differs between the two sequential holographic reproductions by a value significantly smaller than the angular selectivity value. This shortens the time required to change the beam angle, and consequently shortens the entire reproduction time and improves the transfer rate. When the reproduction apparatus shown in FIG. 2 uses a pulse laser with a pulse width of 10 nanoseconds or less as its light source, the beam angle may be changed continuously. This further shortens the time required to change the beam angle, and stabilizes the operation of the drive system that changes the beam angle.

The holographic reproduction method according to the fifth embodiment of the present invention described above is applicable to the holographic recording media on which holograms have been recorded with the multiplexed holographic recording methods according to the first to fourth embodiments. However, recording media to which the holographic reproduction method according to the fifth embodiment of the present invention is applicable should not be limited to such recording media. For example, the holographic reproduction method may be applied to a holographic recording medium on which holograms have been recorded with the conventional multiplexed holographic recording method using angle multiplexing. In this case, the reproduction sequence is not set identical to the conventional recording sequence but is set identical to, for example, the recording sequence that is employed by the multiplexed holographic recording method of the first embodiment of the present invention. More specifically, every time when the angle of the readout beam is set, one hologram is reproduced from each of all the recording regions using the readout beam with the set angle. In this case, the sequence of the reproduced two-dimensional data will be different from the sequence in which the data has been recorded. Thus, the reproduced two-dimensional data will require post-processing, such as rearranging or combining data pieces of the two-dimensional data. However, such post-processing requires much less time as compared with the seek time required by the conventional reproduction method. Thus, the holographic reproduction method according to the fifth embodiment of the present invention enables data to be reproduced at a high speed.

The multiplexed holographic recording method and the holographic reproduction method of the present invention improve the transfer rate by employing the effective recording and reproduction sequences as described above. It is apparent that the present invention is industrially applicable.

The invention claimed is:

1. A multiplexed holographic recording apparatus, comprising:
a holographic recording medium configured to include a plurality of recording regions formed thereon; and
a recording unit configured to record multiplexed holograms in the plurality of recording regions, wherein
the recording unit is configured to first perform N times holographic recordings in each of the plurality of recording regions in a predetermined area on the holographic recording medium, the predetermined area including at least two recording regions, and configured to perform an (N+1)th holographic recording in each of the plurality of recording regions in the predetermined area, and
wherein N is an integer greater than or equal to 2 (N=2, 3, 4, . . . ).

2. The multiplexed holographic recording apparatus according to claim 1, wherein the recording unit is configured to overlap other recording regions of the plurality of recording regions with each of the plurality of recording regions in the predetermined area.

3. The multiplexed holographic recording apparatus according to claim 1, wherein the recording unit is configured to change a beam angle of a reference beam or a signal beam with respect to the holographic recording medium by changing a path of the reference beam or the signal beam, respectively.

4. The multiplexed holographic recording apparatus according to claim 3, wherein when the recording unit first performs an m-th holographic recording in one of the plurality of recording regions, performs one or more of holographic recordings in one or more other recording regions of the plurality of recording regions, and then performs an (m+1)th holographic recording in the recording region in which the m-th holographic recording has been performed, the recording unit is configured to set the beam angle to increase monotonically or decrease monotonically in an order of the holographic recordings.

5. The multiplexed holographic recording apparatus according to claim 4, wherein when the recording unit selects a plurality of recording regions as the other recording regions, the recording unit is configured to set the beam angle to increase monotonically or decrease monotonically in an order of the holographic recordings.

6. The multiplexed holographic recording apparatus according to claim 5, wherein when x represents a number of the plurality of recording regions selected as the other recording regions, the recording unit is configured to set the beam angle to increase or decrease by a value of $1/(x+1)$ between the beam angle used in the m-th holographic recording for the one of the plurality of recording regions and the beam angle used in the (m+1)th holographic recording for the recording region used in the m-th holographic recording.

7. The multiplexed holographic recording apparatus according to claim 3, wherein the recording unit is configured to overlap a plurality of other recording regions with each of the plurality of recording regions in the predetermined area, and then change the beam angle to differ between any two of the recording regions that are overlapped with each other.

8. The multiplexed holographic recording apparatus according to claim 1, wherein the recording unit is configured to arrange the plurality of recording regions in a manner that each of the recording regions is not overlapped with another of the plurality of recording regions, and
the recording unit is configured to first record a predetermined number of multiplexed holograms in one of the plurality of recording regions, and then select, as a target for a next holographic recording, another of the plurality of recording regions that is not adjacent to the recording region in which the predetermined number of multiplexed holograms have been recorded.

9. The multiplexed holographic recording apparatus according to claim 2, wherein the recording unit is configured to first record a predetermined number of multiplexed holograms in one of the plurality of recording regions, and then select, as a target for a next holographic recording, another of the plurality of recording regions that is not overlapped with the recording region in which the predetermined number of multiplexed holograms have been recorded.

10. The multiplexed holographic recording apparatus according to claim 1, wherein when the holographic recording medium is partitioned into a plurality of independent regions, the recording unit is configured to set each of the independent regions as the predetermined area.

11. The multiplexed holographic recording apparatus according to claim 1, wherein the holographic recording medium is a disc, and
the recording unit is configured to select a target recording region from a first group of the plurality of recording regions when repeating holographic recording while moving spots of a signal beam and a reference beam that are focused on the holographic recording medium in a direction from an outer circumference to an inner circumference of the holographic recording medium, and configured to select the target recording region from a second group of the plurality of recording regions that are not overlapped with the recording regions in the first group when repeating the holographic recording while moving the spots in a direction from the inner circumference to the outer circumference of the holographic recording medium.

12. The multiplexed holographic recording apparatus according to claim 1, wherein the holographic recording medium is a disc, and
the recording unit is configured to first perform holographic recording a predetermined number of times or less in the plurality of recording regions that are at a same distance from a center of the holographic recording medium and are formed in the predetermined area, and configured to then move spots of a signal beam and a reference beam that are focused on the holographic recording medium in a radial direction of the holographic recording medium.

13. The multiplexed holographic recording apparatus according to claim 1, wherein the recording unit is configured to irradiate a region on the holographic recording medium that does not overlap any of the plurality of recording regions, or a boundary on the holographic recording medium that is defined by the predetermined area with a predetermined signal beam or a predetermined reference beam.

14. A holographic reproduction apparatus that reads two-dimensional data that has been recorded on a holographic recording medium by the multiplexed holographic recording apparatus according to claim 1, wherein the holographic reproduction apparatus is configured to reproduce holograms in an order of the holographic recordings that are performed in the plurality of recording regions with the multiplexed holographic recording apparatus.

15. A multiplexed holographic recording method for forming a plurality of recording regions on a holographic recording medium, and recording multiplexed holograms in the recording regions, the method comprising:
a first recording step of performing N times holographic recordings in each of the plurality of recording regions formed in a predetermined area on the holographic recording medium, the predetermined area including at least two recording regions; and
a second recording step of performing an (N+1)th holographic recording in the plurality of recording regions recorded in the first recording step,
wherein N is an integer greater than or equal to 2 (N=2, 3, 4, ... ).

16. The multiplexed holographic recording method according to claim 15, wherein each of the plurality of recording regions in the predetermined area is overlapped with other recording regions of the plurality of recording regions.

17. The multiplexed holographic recording method according to claim 15, wherein a beam angle of a reference beam or a signal beam with respect to the holographic recording medium is changed by changing a path of the reference beam or the signal beam, respectively.

18. The multiplexed holographic recording method according to claim 17, wherein when an m-th holographic recording is first performed in one of the plurality of recording regions, then one or more of holographic recordings are performed in one or more other recording regions, and then an (m+1)th holographic recording is performed in the recording region in which the m-th holographic recording has been performed, the beam angle is set to increase monotonically or decrease monotonically in an order of the holographic recordings.

19. The multiplexed holographic recording method according to claim 18, wherein when a plurality of recording regions are selected as the other recording regions, the beam angle is set to increase monotonically or decrease monotonically in an order of the holographic recordings.

20. The multiplexed holographic recording method according to claim 19, wherein when x represents a number of recording regions selected as the other recording regions, the beam angle is set to increase or decrease by a value of $1/(x+1)$ between the beam angle used in the m-th holographic recording for one of the recording regions and the beam angle used in the (m+1)th holographic recording for the recording region used in the m-th holographic recording.

21. The multiplexed holographic recording method according to claim 17, wherein each of the plurality of recording regions is overlapped with other recording regions of the plurality of recording regions, and the beam angle is changed to differ between any two of the recording regions that are overlapped with each other.

22. The multiplexed holographic recording method according to claim 15, wherein the plurality of recording regions are arranged in a manner that each of the plurality of recording regions is not overlapped with other recording regions of the plurality of the recording regions, and a predetermined number of multiplexed holograms are first recorded in one of the plurality of recording regions, and then another of the plurality of recording regions that is not adjacent to the recording region in which the predetermined number of multiplexed holograms have been recorded is selected as a target for a next holographic recording.

23. The multiplexed holographic recording method according to claim 16, wherein a predetermined number of multiplexed holograms are first recorded in one of the plurality of recording regions and then another of the plurality of recording regions that is not overlapped with the recording region in which the predetermined number of multiplexed holograms have been recorded, is selected as a target for a next holographic recording.

24. The multiplexed holographic recording method according to claim 15, wherein when the holographic recording medium is partitioned into a plurality of independent regions, each of the independent regions is set as the predetermined area.

25. The multiplexed holographic recording method according to claim 15, wherein the holographic recording medium is a disc, and a target recording region is selected from a first group of the plurality of recording regions when holographic recording is repeated while spots of a signal beam and a reference beam that are focused on the holographic recording medium are being moved in a direction from an outer circumference to an inner circumference of the holographic recording medium, and the target recording region is selected from a second group of the plurality of recording regions that are not overlapped with the recording regions in the first group when the holographic recording is repeated while the spots are being moved in a direction from the inner circumference to the outer circumference of the holographic recording medium.

26. The multiplexed holographic recording method according to claim 15, wherein the holographic recording medium is a disc, and holographic recording is first performed a predetermined number of times or less in the plurality of recording regions that are at a same distance from a center of the holographic recording medium and are formed in the predetermined area, and then spots of a signal beam and a reference beam that are focused on the holographic recording medium are moved in a radial direction of the holographic recording medium.

27. The multiplexed holographic recording method according to claim 15, wherein a region of the holographic recording medium that does not overlap any other of the plurality of the recording regions, or a boundary defined by the predetermined area is irradiated with a predetermined signal beam or a predetermined reference beam.

28. A holographic reproduction method for reading two-dimensional data that has been recorded on a holographic recording medium with the multiplexed holographic recording method according to claim 15, wherein holograms are reproduced in an order of holographic recordings that are performed in the plurality of recording regions with the multiplexed holographic recording method.

29. A holographic recording medium including a plurality of recording regions in which N multiplexed holograms are recorded, wherein a difference between a highest value and a lowest value of a number of times multiplexed holographic recording is performed in the plurality of recording regions is in a predetermined area of the holographic recording medium, wherein the predetermined area includes at least two recording regions, the difference is maintained not to exceed a predetermined value, and N is an integer greater than or equal to 2 (N=2, 3, 4, . . . ).

* * * * *